United States Patent
Gathala et al.

(10) Patent No.: US 9,298,494 B2
(45) Date of Patent: Mar. 29, 2016

(54) COLLABORATIVE LEARNING FOR EFFICIENT BEHAVIORAL ANALYSIS IN NETWORKED MOBILE DEVICE

(71) Applicant: QUALCOMM Incorporated, San Diego, CA (US)

(72) Inventors: Anil Gathala, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 13/804,518

(22) Filed: Mar. 14, 2013

(65) Prior Publication Data

US 2013/0303159 A1 Nov. 14, 2013

Related U.S. Application Data

(60) Provisional application No. 61/646,590, filed on May 14, 2012, provisional application No. 61/683,274, filed on Aug. 15, 2012.

(51) Int. Cl.
*H04W 24/00* (2009.01)
*G06F 9/46* (2006.01)
(Continued)

(52) U.S. Cl.
CPC .............. *G06F 9/46* (2013.01); *G06F 11/3409* (2013.01); *G06F 21/50* (2013.01); *G06F 21/552* (2013.01);
(Continued)

(58) Field of Classification Search
CPC H04W 24/02; H04W 52/0209; G06F 21/552; G06F 21/50
USPC .................................. 455/410, 423, 425, 411

See application file for complete search history.

(56) References Cited

U.S. PATENT DOCUMENTS 5,870,735 A 2/1999 Agrawal et al.
6,532,541 B1 3/2003 Chang et al.
(Continued)

FOREIGN PATENT DOCUMENTS

CN 102591696 A 7/2012
EP 1182552 A2 2/2002
(Continued)

OTHER PUBLICATIONS

Jean et al., "Boosting-based Distributed and Adaptive Security-Monitoring through Agent Collaboration", 2007 IEEE/WIC/ACM International Conferences on Web Intelligence and Intelligent Agent Technology-Workshops, Nov. 5, 2007, pp. 516-520, DOI 10.1109/WI-IATW.2007.52.*
(Continued)

*Primary Examiner* — Barry Taylor
(74) *Attorney, Agent, or Firm* — Won Tae C. Kim

(57) ABSTRACT

Methods, systems and devices for classifying mobile device behaviors of a first mobile device may include the first mobile device monitoring mobile device behaviors to generate a behavior vector, and applying the behavior vector to a first classifier model to obtain a first determination of whether a mobile device behavior is benign or not benign. The first mobile device may also send the behavior vector to a second mobile device, which may receive and apply the behavior vector to a second classifier model to obtain a second determination of whether the mobile device behavior is benign or not benign. The second mobile device may send the second determination to the first mobile device, which may receive the second determination, collate the first determination and the second determination to generate collated results, and determine whether the mobile device behavior is benign or not benign based on the collated results.

28 Claims, 9 Drawing Sheets

(51) Int. Cl.

| | | |
|---|---|---|
| *G06F 11/34* | (2006.01) | |
| *G06F 21/50* | (2013.01) | |
| *G06F 21/55* | (2013.01) | |
| *H04L 12/24* | (2006.01) | |
| *H04W 24/02* | (2009.01) | |
| *H04W 52/02* | (2009.01) | |
| *G06N 5/04* | (2006.01) | |

(52) U.S. Cl.
CPC ............... *G06N 5/043* (2013.01); *H04L 41/06* (2013.01); *H04W 24/00* (2013.01); *H04W 24/02* (2013.01); *H04W 52/0209* (2013.01)

(56) References Cited

U.S. PATENT DOCUMENTS

| | | |
|---|---|---|
| 6,643,802 B1 | 11/2003 | Frost et al. |
| 7,051,327 B1 | 5/2006 | Milius et al. |
| 7,401,359 B2 | 7/2008 | Gartside et al. |
| 7,559,053 B2 | 7/2009 | Krassovsky et al. |
| 7,561,877 B2 | 7/2009 | Cassett et al. |
| 7,571,478 B2 | 8/2009 | Munson et al. |
| 7,600,014 B2 | 10/2009 | Russell et al. |
| 7,650,317 B2 | 1/2010 | Basu et al. |
| 7,676,573 B2 | 3/2010 | Herzog et al. |
| 7,694,150 B1 | 4/2010 | Kirby |
| 7,757,292 B1 | 7/2010 | Renert et al. |
| 7,774,599 B2 | 8/2010 | Guo et al. |
| 7,831,237 B2 | 11/2010 | Passarella et al. |
| 7,831,248 B2 | 11/2010 | Lee |
| 7,849,360 B2 | 12/2010 | Largman et al. |
| 7,877,621 B2 | 1/2011 | Jacoby et al. |
| 7,881,291 B2 | 2/2011 | Grah |
| 7,890,443 B2 | 2/2011 | Zhang et al. |
| 7,945,955 B2 | 5/2011 | Katkar |
| 8,045,958 B2 | 10/2011 | Kahandaliyanage |
| 8,087,067 B2 | 12/2011 | Mahaffey et al. |
| 8,095,964 B1 | 1/2012 | Zhong et al. |
| 8,161,548 B1 | 4/2012 | Wan |
| 8,201,244 B2 | 6/2012 | Sun et al. |
| 8,201,249 B2 | 6/2012 | McCallam |
| 8,225,093 B2 | 7/2012 | Fok et al. |
| 8,245,295 B2 | 8/2012 | Park et al. |
| 8,245,315 B2 | 8/2012 | Cassett et al. |
| 8,266,698 B1 | 9/2012 | Seshardi et al. |
| 8,311,956 B2 | 11/2012 | Sen et al. |
| 8,312,545 B2 | 11/2012 | Tuvell et al. |
| 8,321,941 B2 | 11/2012 | Tuvell et al. |
| 8,331,987 B2 | 12/2012 | Rosenblatt |
| 8,332,945 B2 | 12/2012 | Kim et al. |
| 8,347,386 B2 | 1/2013 | Mahaffey et al. |
| 8,397,301 B2 | 3/2013 | Hering et al. |
| 8,443,439 B2 | 5/2013 | Lamastra et al. |
| 8,458,809 B2 | 6/2013 | Adams et al. |
| 8,516,584 B2 | 8/2013 | Moskovitch et al. |
| 8,533,844 B2 | 9/2013 | Mahaffey et al. |
| 8,554,912 B1 | 10/2013 | Reeves et al. |
| 8,694,744 B1 | 4/2014 | Raj et al. |
| 8,701,192 B1 | 4/2014 | Glick et al. |
| 8,762,298 B1 | 6/2014 | Ranjan et al. |
| 8,763,127 B2 | 6/2014 | Yao et al. |
| 8,775,333 B1 | 7/2014 | Zahn |
| 2002/0099756 A1 | 7/2002 | Catthoor et al. |
| 2004/0039924 A1 | 2/2004 | Baldwin et al. |
| 2004/0068721 A1 | 4/2004 | O'Neill et al. |
| 2004/0083366 A1 | 4/2004 | Nachenberg et al. |
| 2004/0221163 A1 | 11/2004 | Jorgensen et al. |
| 2005/0144480 A1 | 6/2005 | Kim et al. |
| 2006/0026464 A1 | 2/2006 | Atkin et al. |
| 2006/0085854 A1 | 4/2006 | Agrawal et al. |
| 2006/0288209 A1 | 12/2006 | Vogler |
| 2007/0006304 A1* | 1/2007 | Kramer et al. .................. 726/22 |
| 2007/0136455 A1 | 6/2007 | Lee et al. |
| 2007/0192866 A1 | 8/2007 | Sagoo et al. |
| 2007/0199060 A1 | 8/2007 | Touboul |
| 2007/0220327 A1 | 9/2007 | Ruscio et al. |
| 2007/0283170 A1 | 12/2007 | Yami et al. |
| 2007/0287387 A1 | 12/2007 | Keum et al. |
| 2007/0294768 A1 | 12/2007 | Moskovitch et al. |
| 2008/0016339 A1 | 1/2008 | Shukla |
| 2008/0026464 A1 | 1/2008 | Borenstein et al. |
| 2008/0046755 A1 | 2/2008 | Hayes |
| 2008/0047009 A1 | 2/2008 | Overcash et al. |
| 2008/0086773 A1 | 4/2008 | Tuvell et al. |
| 2008/0109495 A1 | 5/2008 | Herberger et al. |
| 2008/0140821 A1 | 6/2008 | Tada |
| 2008/0162686 A1 | 7/2008 | Kalaboukis et al. |
| 2008/0163382 A1 | 7/2008 | Blue et al. |
| 2008/0172746 A1 | 7/2008 | Lotter et al. |
| 2008/0228429 A1 | 9/2008 | Huang et al. |
| 2009/0019546 A1 | 1/2009 | Park et al. |
| 2009/0199296 A1 | 8/2009 | Xie et al. |
| 2009/0217078 A1 | 8/2009 | Cassett et al. |
| 2009/0239531 A1 | 9/2009 | Andreasen et al. |
| 2009/0287618 A1 | 11/2009 | Weinberger et al. |
| 2009/0288080 A1 | 11/2009 | Partridge |
| 2009/0288164 A1 | 11/2009 | Adelstein et al. |
| 2009/0300765 A1 | 12/2009 | Moskovitch et al. |
| 2009/0327168 A1 | 12/2009 | Weinberger et al. |
| 2010/0011029 A1 | 1/2010 | Niemel |
| 2010/0036786 A1 | 2/2010 | Pujara |
| 2010/0082513 A1* | 4/2010 | Liu ............................... 706/46 |
| 2010/0105404 A1 | 4/2010 | Palanki et al. |
| 2010/0107257 A1 | 4/2010 | Ollmann |
| 2010/0128125 A1 | 5/2010 | Warzelhan |
| 2010/0153371 A1 | 6/2010 | Singh |
| 2010/0154032 A1 | 6/2010 | Ollmann |
| 2010/0175135 A1 | 7/2010 | Kandek et al. |
| 2010/0192201 A1 | 7/2010 | Shimoni et al. |
| 2010/0241974 A1 | 9/2010 | Rubin et al. |
| 2010/0251340 A1 | 9/2010 | Martin et al. |
| 2010/0262693 A1 | 10/2010 | Stokes et al. |
| 2010/0296496 A1 | 11/2010 | Sinha et al. |
| 2010/0299292 A1 | 11/2010 | Collazo |
| 2010/0313269 A1 | 12/2010 | Ye |
| 2011/0004935 A1 | 1/2011 | Moffie et al. |
| 2011/0013528 A1 | 1/2011 | Chen |
| 2011/0023118 A1 | 1/2011 | Wright |
| 2011/0060948 A1 | 3/2011 | Beebe |
| 2011/0105096 A1 | 5/2011 | Dods et al. |
| 2011/0145920 A1 | 6/2011 | Mahaffey et al. |
| 2011/0161452 A1* | 6/2011 | Poornachandran et al. .. 709/207 |
| 2011/0219449 A1 | 9/2011 | St. Neitzel et al. |
| 2011/0264764 A1 | 10/2011 | Kewalramani et al. |
| 2011/0286437 A1 | 11/2011 | Austin et al. |
| 2011/0302654 A1 | 12/2011 | Miettinen |
| 2011/0302656 A1 | 12/2011 | El-Moussa |
| 2011/0307233 A1 | 12/2011 | Tseng et al. |
| 2012/0016633 A1 | 1/2012 | Wittenstein et al. |
| 2012/0051228 A1 | 3/2012 | Shuman et al. |
| 2012/0060219 A1 | 3/2012 | Larsson et al. |
| 2012/0096539 A1* | 4/2012 | Hu et al. ........................ 726/13 |
| 2012/0110174 A1 | 5/2012 | Wootton et al. |
| 2012/0131674 A1 | 5/2012 | Wittenschlaeger |
| 2012/0151062 A1 | 6/2012 | Gusev et al. |
| 2012/0159633 A1 | 6/2012 | Grachev et al. |
| 2012/0167162 A1 | 6/2012 | Raleigh et al. |
| 2012/0167217 A1 | 6/2012 | McReynolds |
| 2012/0167218 A1* | 6/2012 | Poornachandran ... G06F 21/566 726/24 |
| 2012/0180126 A1 | 7/2012 | Liu et al. |
| 2012/0207046 A1 | 8/2012 | Di Pietro et al. |
| 2012/0210423 A1 | 8/2012 | Friedrichs et al. |
| 2012/0227105 A1 | 9/2012 | Friedrichs et al. |
| 2012/0233694 A1 | 9/2012 | Baliga et al. |
| 2012/0245481 A1 | 9/2012 | Blanco et al. |
| 2012/0254333 A1 | 10/2012 | Chandramouli et al. |
| 2012/0270611 A1 | 10/2012 | Choi et al. |
| 2012/0311366 A1 | 12/2012 | Alsina et al. |
| 2012/0311708 A1 | 12/2012 | Agarwal et al. |
| 2012/0317306 A1 | 12/2012 | Radinsky et al. |
| 2012/0321175 A1 | 12/2012 | Hedau et al. |
| 2012/0323853 A1 | 12/2012 | Fries et al. |
| 2013/0014262 A1 | 1/2013 | Lee et al. |

(56) References Cited

U.S. PATENT DOCUMENTS

| | | | |
|---|---|---|---|
| 2013/0031600 A1 | 1/2013 | Luna et al. | |
| 2013/0066815 A1 | 3/2013 | Oka et al. | |
| 2013/0073983 A1 | 3/2013 | Rasmussen et al. | |
| 2013/0097706 A1 | 4/2013 | Titonis et al. | |
| 2013/0151848 A1 | 6/2013 | Baumann et al. | |
| 2013/0167231 A1* | 6/2013 | Raman et al. | 726/23 |
| 2013/0179991 A1 | 7/2013 | White et al. | |
| 2013/0203440 A1 | 8/2013 | Bilange et al. | |
| 2013/0204812 A1 | 8/2013 | Sterzing et al. | |
| 2013/0247187 A1 | 9/2013 | Hsiao et al. | |
| 2013/0267201 A1 | 10/2013 | Gupta et al. | |
| 2013/0303154 A1 | 11/2013 | Gupta et al. | |
| 2013/0304676 A1 | 11/2013 | Gupta et al. | |
| 2013/0304677 A1 | 11/2013 | Gupta et al. | |
| 2013/0304869 A1 | 11/2013 | Gupta et al. | |
| 2013/0305101 A1 | 11/2013 | Gupta et al. | |
| 2013/0305358 A1 | 11/2013 | Gathala et al. | |
| 2013/0305359 A1 | 11/2013 | Gathala et al. | |
| 2014/0007183 A1 | 1/2014 | Qureshi et al. | |
| 2014/0051432 A1 | 2/2014 | Gupta et al. | |
| 2014/0053260 A1 | 2/2014 | Gupta et al. | |
| 2014/0053261 A1 | 2/2014 | Gupta et al. | |
| 2014/0096246 A1 | 4/2014 | Morrissey et al. | |
| 2014/0150100 A1 | 5/2014 | Gupta et al. | |
| 2014/0187177 A1 | 7/2014 | Sridhara et al. | |
| 2014/0188781 A1 | 7/2014 | Fawaz | |
| 2014/0205099 A1 | 7/2014 | Christodorescu et al. | |
| 2014/0237595 A1 | 8/2014 | Sridhara et al. | |
| 2014/0245306 A1 | 8/2014 | Gathala et al. | |
| 2014/0279745 A1 | 9/2014 | Esponda et al. | |
| 2014/0317734 A1 | 10/2014 | Valencia et al. | |
| 2014/0337862 A1 | 11/2014 | Valencia et al. | |
| 2015/0148109 A1 | 5/2015 | Gupta et al. | |

FOREIGN PATENT DOCUMENTS

| | | |
|---|---|---|
| EP | 1983686 A1 | 10/2008 |
| EP | 2182458 A1 | 5/2010 |
| EP | 2326057 A1 | 5/2011 |
| EP | 2406717 A1 | 1/2012 |
| EP | 2680182 A1 | 1/2014 |
| TW | 200937198 A | 9/2009 |
| TW | 201239618 A | 10/2012 |
| WO | WO-2010048502 | 4/2010 |
| WO | 2010126416 A1 | 11/2010 |
| WO | 2011147580 A1 | 12/2011 |
| WO | 2013016692 | 1/2013 |
| WO | WO-2013080096 A1 | 6/2013 |
| WO | WO-2013172865 A1 | 11/2013 |
| WO | WO-2013173003 A2 | 11/2013 |

OTHER PUBLICATIONS

Hu W., et al., "AdaBoost-Based Algorithm for Network Intrusion Detection," IEEE Transactions on Systems, Man, and Cybernetics, Part B: Cybernetics, Apr. 2008, vol. 38 (2), pp. 577-583.

Lu Y. B., et al., "Using Multi-Feature and Classifier Ensembles to Improve Malware Detection", Journal of Chung Cheng Institute of Technology, vol. 39, No. 2, Nov. 2010, pp. 57-72, XP55086345, ISSN: 0255-6030.

Natesan P. et al., "Design of Two Stage Filter Using Enhanced Adaboost for Improving Attack Detection Rates in Network Intrusion Detection", International Journal of Computer Science and Information Technology & Security, vol. 2, No. 2, Apr. 2012, pp. 349-358, XP55086347, ISSN: 2249-955.

Shabtai A., "Malware Detection on Mobile Devices," Eleventh International Conference on Mobile Data Management, IEEE Computer Society, 2010, pp. 289-290.

Sheen S., et al., "Network Intrusion Detection using Feature Selection and Decision tree Classifier," TENCON—IEEE Region 10 Conference, 2008, pp. 1-4.

Abu-Nimeh S., "Phishing detection using distributed Bayesian additive regression trees", Dec. 13, 2008, Southern Methodist University, 28 pages, XP055107295, ISBN: 9780549908630 chapters 2, 4, 6 and 8.

Chekina L., et al., "Detection of deviations in mobile applications network behavior", arXiv:1208.0564v2, Aug. 5, 2012, 5 pages, XP005107301, Retrieved from the Internet: URL: http://arxiv.org/abs/1208.0564v2 [retrieved on Nov. 1, 2013] the whole document.

Folino G., et al., "An ensemble-based evolutionary framework for coping with distributed intrusion detection", Genetic Programming and Evolvable Machines, vol. 11, No. 2, Feb. 7, 2010, pp. 131-146, XP019789345, DOI: 10.1007/S10710-010-9101-6 the whole document.

Gao J., et al., "Adaptive distributed intrusion detection using parametric model", Proceedings of the 2009 IEEE/WIC/ACM International Joint Conferences on Web Intelligence and Intelligent Agent Technologies (WI-IAT'09), vol. 1, Sep. 15, 2009, pp. 675-678, XP055107983, DOI: 10.1109/WI-IAT.2009.113 the whole document.

International Search Report and Written Opinion—PCT/US2013/038414—ISA/EPO—Mar. 28, 2014.

Jean E., et al., "Boosting-based distributed and adaptive security-monitoring through agent collaboration", Proceedings of the 2007 IEEE/WIC/ACM International Conferences on Web Intelligence and Intelligent Agent Technology Workshops (WI-IATW'07), Nov. 5, 2007, pp. 516, 518-520, XP031200055, DOI: 10-1109/WI-IATW.2007.52 the whole document.

Miluzzo E., et al., "Vision: mClouds—computing on clouds of mobile devices", Proceedings of the 3rd ACM Workshop on Mobile Cloud Computing and Services (MCS'12), Jun. 25, 2012, pp. 9-14, XP055107956, DOI: 10.1145/2307849.2307854 the whole document.

Schmidt A.D., et al., "Static analysis of executables for collaborative malware detection on Android", Proceedings of the 2009 IEEE International Conference on Communications (ICC'09), Jun. 14, 2009, 3 Pages, XP031506460, DOI: 10.1109/ICC.2009.5199486 the whole document.

Shabtai A., et al., "a Andromalya: a behavioral malware detection framework for android devices", Journal of Intelligent Information Systems, Kluwer Academic Publishers, BO, vol. 38, No. 1, Jan. 6, 2011, pp. 161-190, XP019998836, ISSN: 1573-7675, DOI: 10.1007/S10844-010-0148-X paragraph [5.3.1]-paragraph [5.3.4].

Shamili A.S., et al., "Malware detection on mobile devices using distributed machine learning", Proceedings of the 20th International Conference on Pattern Recognition (ICPR'10), Aug. 23, 2010, pp. 4348-4351, XP031772702, DOI: 10.1109/ICPR.2010.1057 the whole document.

Tabish S.M., "Malware detection using statistical analysis of byte-level file content", Proceedings of the ACM SIGKDD Workshop on Cybersecurity and Intelligence Informatics (CSI-KDD'09), Jun. 28, 2009, pp. 23-31, XP055107225, DOI: 10.1145/1599272.1599278 the whole document.

De Stefano C., et al., "Pruning GP-Based Classifier Ensembles by Bayesian Networks," Lecture Notes in Computer Science, Sep. 1, 2012, pp. 236-245, XP047016355, DOI: 10.1007/978-3-642-32937-1_24, Sections 1 and 2.

International Search Report and Written Opinion—PCT/US2013/078350—ISA/EPO—Oct. 29, 2014.

International Search Report and Written Opinion—PCT/US2013/078352—ISA/EPO—Nov. 10, 2014.

Saller K., et al., "Reducing Feature Models to Improve Runtime Adaptivity on Resource Limited Devices," Proceedings of the 16th International Software Product Line Conference (SPLC), Sep. 2, 2012, vol. 11, pp. 135-142, XP058009814, DOI: 10.1145/2364412.2364435, Section 5.

Kachirski O., et al., "Effective Intrusion Detection Using Windows Sensors in Wireless Ad Hoc Networks", IEEE Proceedings of the 36th Hawaii International Conference on System Sciences, 2002, 8 Pages.

Kirda E., et al., "Behavior-Based Spyware Detection", 15th USENIX Security Symposium, 2002, pp. 273-288.

Caruana, et al., "An Empirical Comparison of Supervised Learning Algorithms", ICML, 2006, 8 pgs.

Caruana, et al., "An Empirical Evaluation of Supervised Learning in High Dimensions", ICML, 2008, 8 pgs.

(56) References Cited

OTHER PUBLICATIONS

Co-pending U.S. Appl. No. 13/558,527, filed Jul. 7, 2012.
Qin F., "System Support for Improving Software Dependability During Production Runs," Urbana, Illinois, 1998, pp. 1-116.
Shabtai A., et al., "Dectecting unknown malicious code by applying classification techniques on OpCode patterns," Security Informatics a Springer Open Journal, 2012, vol. 1 (1), pp. 1-22.
Wang Y-M., et al., "Strider: A Black-Box, State-based Approach to Change and Configuration Management and Support," 2003 LISA XVII—Oct. 26-31, 2003—San Diego, CA, pp. 165-178.
Kolter J.Z., et al., "Learning to Detect Malicious Executables in the Wild", ACM Knowl. Discovery and Data Mining (KDD), 2004, pp. 470-478, Aug. 2004.
Gavin Mcwilliams: "Malware detection methods for fixed and mobile networks", Centre for Secure Information Technologies—Queen'S University Belfast, Jan. 23, 2013, pp. 1-21, XP017577639, [retrieved on 2013-01-23] the whole document.
International Search Report and Written Opinion—PCT/US2015/012525—ISA/EPO—Apr. 29, 2015.
Jarle Kittilsen: "Detecting malicious PDF documents", Dec. 1, 2011, pp. 1-112, XP055947997, Gjovik, Norway Retrieved from the Internet: URL:http:f/brage.bibsys.no/hig/retrieve/21 28/Jarle Kittilsen.pdf [retrieved on Dec. 14, 2012] the whole document.
Yerima.S.Y. et al., "A New Android Malware Detection Approach Using Bayesian Classification", 2014 IEEE 28th International Conference on advanced Information Networking and Applications, IEEE, Mar. 25, 2013, pp. 121-128, XP032678454, ISSN: 1550-445X, DOI: 10.1109/AINA.2013.88 ISBN: 978-1-4673-5550-6 [retrived on Jun. 13, 2013]the whole document.
Burguera I., et al., "Crowdroid", Security and Privacy in Smartphones and Mobile Devices, ACM, 2 Penn Plaza, Suite 701 NewYork NY 10121-0701 USA, Oct. 17, 2011, XP058005976, DOI: 10.1145/2046614.2046619 ISBN: 978-1-4503-1000-0, pp. 15-26.
Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X, DOI:10.1007/s11036-008-0113-x.
Kaspersky Endpoint Security 8 for Smartphone Program Version 8.0, Updated on Feb. 8, 2012.
Lee., et al., "A Data Mining Framework for Building Intrusion Detection Models", Published in: Proceedings of the 1999 IEEE Symposium on Security and Privacy, 1999. Backspace, Conference Location: Oakland, CA, Date of Conference: 1999, pp. 120-132, Meeting Date: May 9, 1999-May 12, 1999.
Tan, P.N., et al., "Introduction to data mining," Library of Congress, 2006, Chapter 4.
Voulgaris., et al., "Dimensionality Reduction for Feature and Pattern Selection in Classification Problems", Published in:, 2008. ICCGI '08. The Third International Multi-Conference on Computing in the Global Information Technology, Conference Location: Athens Date of Conference: Jul. 27, 2008-Aug. 1, 2008, pp. 160-165.

\* cited by examiner

COLLABORATIVE LEARNING FOR EFFICIENT BEHAVIORAL ANALYSIS IN NETWORKED MOBILE DEVICE

RELATED APPLICATIONS

This application claims the benefit of priority to U.S. Provisional Patent Application No. 61/646,590 entitled "System, Apparatus and Method for Adaptive Observation of Mobile Device Behavior" filed May 14, 2012; and U.S. Provisional Application No. 61/683,274, entitled "System, Apparatus and Method for Adaptive Observation of Mobile Device Behavior" filed Aug. 15, 2012, the entire contents of all of which are hereby incorporated by reference for all purposes.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, identifying and correcting the conditions and/or mobile device behaviors that may negatively impact the mobile device's long term and continued performance and power utilization levels is beneficial to consumers.

SUMMARY

The various aspects include methods of classifying mobile device behaviors of a mobile device by monitoring mobile device behaviors in a first mobile device to generate a behavior vector, applying the behavior vector to a first classifier model in the first mobile device to obtain a first determination of whether a mobile device behavior is benign or not benign, sending the behavior vector to a second mobile device, the second mobile device applying the behavior vector to a second classifier model to obtain a second determination of whether the mobile device behavior is benign or not benign and sending the second determination to the first mobile device, collating the first determination and the second determination in the first mobile device to generate collated results, and determining whether the mobile device behavior is benign or not benign based on the collated results.

In an aspect, the first and second mobile devices maybe in the same local network. In a further aspect, sending the behavior vector to the second mobile device may include broadcasting the behavior vector to all mobile devices on the same local network. In a further aspect, collating the first determination and the second determination in the first mobile device to generate the collated results may include calculating a weighted linear combination of the first determination and the second determination. In a further aspect, collating the first determination and the second determination in the first mobile device to generate the collated results may include multiplying the first determination by a first confidence value to generate a first result, multiplying the second determination by a second confidence value to generate a second result, and summing the first result with the second result, in which the first confidence value is determined by the first classifier model and the second confidence value is determined by the second classifier model in the second mobile device and sent to the first mobile device along with the second determination.

In a further aspect, the method may include joining a trust network that includes a plurality of trusted mobile devices by performing group formation operations that include establishing direct communication links to each of the plurality of trusted mobile devices via WiFi-Direct technologies, in which sending the behavior vector to the second mobile device may include sending the behavior vector to one of the plurality of trusted mobile devices.

Further aspects include a mobile computing device that includes a processor, means for monitoring mobile device behaviors to generate a behavior vector, means for applying the behavior vector to a first classifier model to obtain a first determination of whether a mobile device behavior is benign or not benign, means for sending the behavior vector to a second mobile device, means for receiving a second determination of whether the mobile device behavior is benign or not benign from the second mobile device in response to sending the behavior vector to the second mobile device, means for collating the first determination and the second determination to generate collated results, and means for determining whether the mobile device behavior is benign or not benign based on the collated results.

In an aspect, means for sending the behavior vector to a second mobile device may include means for sending the behavior vector to a mobile computing device in a local network. In a further aspect, means for sending the behavior vector to a second mobile device may include means for broadcasting the behavior vector to all mobile devices in a local network. In a further aspect, means for collating the first determination and the second determination to generate collated results may include means for generating a weighted linear combination of the first determination and the second determination. In a further aspect, means for collating the first determination and the second determination to generate collated results may include means for multiplying the first determination by a first confidence value to generate a first result, means for multiplying the second determination by a second confidence value to generate a second result, and means for summing the first result with the second result, in which the first confidence value is determined by the first classifier model and the second confidence value is determined by the second classifier model in the second mobile device and sent to the first mobile device along with the second determination.

In a further aspect, the mobile computing device may include means for joining a trust network that includes a plurality of trusted mobile devices by performing group formation operations that include establishing direct communication links to each of the plurality of trusted mobile devices via peer-to-peer or WiFi-Direct technologies, and in which means for sending the behavior vector to the second mobile device includes means for sending the behavior vector to one of the plurality of trusted mobile devices.

Further aspects include a mobile computing device having a processor configured with processor-executable instructions to perform operations that may include monitoring mobile device behaviors to generate a behavior vector, applying the behavior vector to a first classifier model to obtain a first determination of whether a mobile device behavior is benign or not benign, sending the behavior vector to a second mobile device, receiving a second determination of whether the mobile device behavior is benign or not benign from the second mobile device in response to sending the behavior vector to the second mobile device, collating the first determination and the second determination to generate collated results, and determining whether the mobile device behavior is benign or not benign based on the collated results.

In an aspect, the processor may be configured with processor-executable instructions to perform operations such that sending the behavior vector to the second mobile device includes sending the behavior vector to a mobile device in a local network. In a further aspect, the processor may be configured with processor-executable instructions to perform operations such that sending the behavior vector to the second mobile device includes broadcasting the behavior vector to all mobile devices in a local network. In a further aspect, the processor may be configured with processor-executable instructions to perform operations such that collating the first determination and the second determination to generate the collated results includes generating a weighted linear combination of the first determination and the second determination.

In a further aspect, the processor may be configured with processor-executable instructions to perform operations such that collating the first determination and the second determination to generate the collated results includes multiplying the first determination by a first confidence value to generate a first result, multiplying the second determination by a second confidence value to generate a second result, and summing the first result with the second result, in which the first confidence value is determined by the first classifier model and the second confidence value is determined by the second classifier model in the second mobile device and sent to the first mobile device along with the second determination.

In a further aspect, the processor may be configured with processor-executable instructions to perform operations further including joining a trust network that includes a plurality of trusted mobile devices by performing group formation operations that include establishing direct communication links to each of the plurality of trusted mobile devices via WiFi-Direct technologies, in which sending the behavior vector to the second mobile device includes sending the behavior vector to one of the plurality of trusted mobile devices.

Further aspects include a non-transitory computer readable storage medium having stored thereon processor-executable software instructions configured to cause a mobile device processor to perform operations that may include monitoring mobile device behaviors to generate a behavior vector, applying the behavior vector to a first classifier model to obtain a first determination of whether a mobile device behavior is benign or not benign, sending the behavior vector to a second mobile device, receiving a second determination of whether the mobile device behavior is benign or not benign from the second mobile device in response to sending the behavior vector to the second mobile device, collating the first determination and the second determination to generate collated results, and determining whether the mobile device behavior is benign or not benign based on the collated results.

In an aspect, the stored processor-executable software instructions may be configured to cause the mobile device processor to perform operations such that sending the behavior vector to the second mobile device includes sending the behavior vector to a mobile device in a local network. In a further aspect, the stored processor-executable software instructions may be configured to cause the mobile device processor to perform operations such that sending the behavior vector to the second mobile device includes broadcasting the behavior vector to all mobile devices in a local network.

In a further aspect, the stored processor-executable software instructions may be configured to cause the mobile device processor to perform operations such that collating the first determination and the second determination to generate the collated results includes generating a weighted linear combination of the first determination and the second determination.

In a further aspect, the stored processor-executable software instructions may be configured to cause the mobile device processor to perform operations such that collating the first determination and the second determination to generate the collated results includes multiplying the first determination by a first confidence value to generate a first result, multiplying the second determination by a second confidence value to generate a second result, and summing the first result with the second result, in which the first confidence value is determined by the first classifier model and the second confidence value is determined by the second classifier model in the second mobile device and sent to the first mobile device along with the second determination.

In a further aspect, the stored processor-executable software instructions may be configured to cause the mobile device processor to perform operations further including joining a trust network that includes a plurality of trusted mobile devices by performing group formation operations that include establishing direct communication links to each of the plurality of trusted mobile devices via WiFi-Direct technologies, in which sending the behavior vector to the second mobile device includes sending the behavior vector to one of the plurality of trusted mobile devices.

A further aspect includes a system of at least a first mobile device and a second mobile device configured to perform the operations of the methods summarized above. Any number of mobile devices may be included in such a system.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
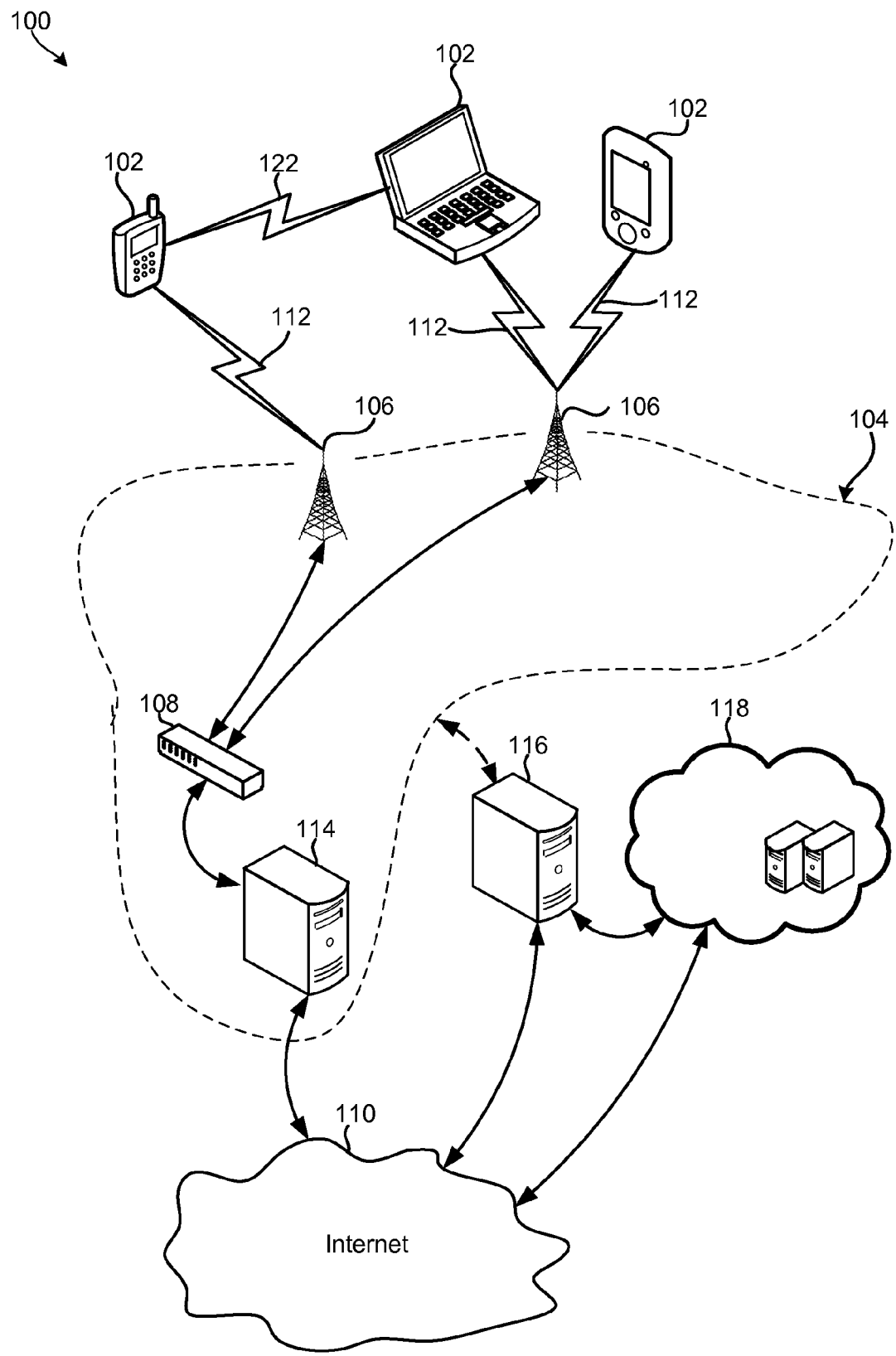
FIG. 1 is a communication system block diagram illustrating network components of an example telecommunication system suitable for use in the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The various aspects provide mobile devices, systems, and methods for efficiently identifying, classifying, modeling, preventing, and/or correcting the conditions and/or mobile device behaviors that often degrade a mobile computing device's performance, power utilization levels, network usage levels, security and/or privacy over time. By configuring a plurality of mobile devices to work in conjunction each other and share the results of their analyses, the various aspects enable each mobile device to improve the performance of its behavior analysis operations, more accurately identify performance-degrading behaviors of the mobile device, and react to performance-limiting and undesirable operating conditions much faster and with lower power consumption than if such analysis were accomplished independently within each mobile device.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

The term "performance degradation" is used herein to refer to a wide variety of undesirable mobile device operations and characteristics, such as longer processing times, slower real time responsiveness, lower battery life, loss of private data, malicious economic activity (e.g., sending unauthorized premium SMS message), denial of service (DoS), operations relating to commandeering the mobile device or utilizing the phone for spying or botnet activities, etc.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Mobile devices are resource constrained systems that have relatively limited processing, memory, and energy resources. Modern mobile devices are also complex systems, and there are a large variety of factors that may contribute to the degradation in performance and power utilization levels of a mobile device over time, including poorly designed software applications, malware, viruses, fragmented memory, background processes, etc. Due to the number, variety, and complexity of these factors, it is often not feasible to evaluate all the factors that may contribute to the degradation in performance and/or power utilization levels of the complex yet resource-constrained systems of modern mobile devices.

To provide better performance in view of these facts, the various aspects include mobile devices that include behavior monitoring and analysis modules configured to work in conjunction with other mobile devices to intelligently and efficiently identify factors that may contribute to the degradation in performance and power utilization levels of mobile devices over time. Each mobile device may be configured with behavior monitoring and analysis modules that include learning capabilities to develop their own classifier models from observed behaviors and performance consequences. While such learning methods may be effective, they are nevertheless limited to the behaviors and operating conditions that have been observed by an individual mobile device. The various embodiments overcome such limitations by configuring the mobile devices to collaborate with other mobile devices, thereby enabling better capability of all devices to accurately identify performance-degrading behaviors and factors. This collaboration may be accomplished by broadcasting a behavior vector to other mobile devices so that the behavior vector can be processed by each mobile device's classification model. The results of such processing, such as a determination of whether the behavior vector indicates benign, not benign or suspicious operating conditions, are then returned to the broadcasting mobile device, which can combine received results with the results of its own classifier model to arrive at a better determination of the condition.

Each of a plurality of mobile devices may be configured to perform behavior observation and analysis operations to identify programs/processes that have a high potential to contribute to the mobile device's degradation (e.g., programs that are actively malicious, poorly written, etc.). Such behavior observation and analysis operations may include an observer process, daemon, module, or sub-system (herein collectively referred to as a "module") of a mobile device instrumenting or coordinating various application programming interfaces (APIs) at various levels of the mobile device system, and collecting behavior information from the instrumented APIs. The observer module may communicate (e.g., via a memory write operation, function call, etc.) the collected behavior information to a classifier module and/or an analyzer module (e.g., via a memory write operation, etc.) of the mobile device, which may analyze and/or classify the collected behavior information, generate behavior vectors, generate spatial and/or temporal correlations based on the behavior vector and information collected from various other mobile device sub-systems, and determine whether a particular mobile device behavior, software application, or process is benign, suspicious, malicious, or performance-degrading.

In various aspects, the analyzer module and/or classifier module of each mobile device may be configured to generate, execute, or apply one or more classifiers or data/behavior models. For example, the analyzer module and/or classifier module may be configured to perform real-time analysis operations, which may include applying data, algorithms, and/or behavior models to behavior information collected by the observer module to determine whether a mobile device behavior is benign, suspicious, malicious, or performance-degrading. In an aspect, the analyzer module and/or classifier module may determine that a mobile device behavior is suspicious when the analyzer/classifier module does not have sufficient information to determine with a high degree of confidence that a mobile device behavior is either benign or malicious.

In an aspect, mobile devices may be configured to establish or join a trust network that includes a plurality of pre-screened or trusted mobile devices. In various aspects, establishing or joining a trust network may include each mobile device performing group formation operations that include establishing communication links to the other mobile devices another via peer-to-peer, WiFi-Direct, or other similar technologies. Mobile devices may also be connected via a shared secure network, enterprise virtual private network, and other similar technologies or group classifications. In an aspect, a trusted network may include mobile devices that are the same network or which have direct communication links.

Each mobile device in the trusted network may be configured to perform collaborative learning operations that include sharing the generated behavior vectors, the results of the real-time analysis operations, and other similar information with other mobile devices in the trusted network. For example, a first mobile device in the trusted network may perform real-time behavior analysis operations by applying a data/behavior model (or classifier) to behavior information collected by an observer module of the first mobile device to generate a first unit of analysis results suitable for use in determining whether a mobile device behavior is benign or not benign.

The first mobile device may broadcast or otherwise send the behavior vector to a second mobile device, which may receive the behavior vector and apply the received behavior vector to its own behavior models (or classifiers) to generate a second unit of analysis results. The second mobile device may then send the second unit of analysis results to the first mobile device, which may combine or collate the second unit of analysis results with the previously generated real-time analysis results, and use the combined/collated results to better evaluate and classify an observed mobile device behavior, perform more accurate classification/analysis operations, and/or generate more accurate data/behavior models. Thus, by combining the results of two weak learners (e.g., results of the initial analysis performed in the first and second mobile devices), the first mobile device is able to become a strong learner capable of generating more accurate analysis results that better identify suspicious or performance-degrading mobile device behaviors, software applications, processes, etc.

In various aspects, the mobile devices may be configured to combine received and self generated analysis results using any known method of combining results of weak learners, such as statistical analysis methods, boosted decision tree analysis (see below), machine learning methods, and context modeling techniques. A mobile device that is a weak learner may become a strong learner by combining results of multiple weak learners (e.g., its own results and results received from at least one other mobile device). The mobile devices may be further configured to exchange their combined/stronger results or updated behavior models generated based on the combined/stronger results for use in further determining whether a mobile device behavior is benign or malicious/performance-degrading. In this manner, the mobile device may perform collaborative learning operations for near continuous refinement of the classification accuracy of the mobile devices.

In addition to exchanging the results of the real-time behavior operations, each mobile device may also be configured to generate or update its data/behavior models by performing, executing, and/or applying machine learning and/or context modeling techniques to behavior information and/or the results of behavior analyses provided by many mobile devices. For example, a mobile device may receive a large number of reports from many mobile devices and analyze, consolidate or otherwise turn such information into focused behavior models that can be used to better classify a mobile device behavior.

In an aspect, a mobile device may be configured to continuously reevaluate the results of behavior analysis operations performed on the mobile device as new behavior/analysis results are received from other mobile devices. The mobile device may collate, combine, amalgamate, or correlate the results and generate new or updated data/behavior models based any combination of the received results, historical information (e.g., collected from prior executions, previous applications of behavior models, etc.), combined results, new information, machine learning, context modeling, detected changes in the available information, mobile device states, environmental conditions, network conditions, mobile device performance, battery consumption levels, etc.

In an aspect, each mobile device in a trusted network may be configured to broadcast its behavior vector/signature accordingly to a schedule, which may be set by a mobile device in the trusted network that is designated, pre-selected, or elected as a group leader. The other mobile devices in the network may activate broadcast receiver circuitry at the scheduled times to receive the broadcast.

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile devices 102 (e.g., cell phones, laptops, tablets, etc.) and other network destinations, such as via telephone land lines (e.g., a POTS network, not shown) and the Internet 110. Communications between the mobile devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

Each mobile device 102 may be configured to share behavior vectors, data/behavior models, the results of real-time behavior analysis operations, success rates, and other similar information with other mobile device 102 in the system 100. Communications between the mobile devices 102 may be accomplished through direct or peer-to-peer communication links 122, telephone network 104, or via the Internet 110.

The communication system 100 may further include network servers 116 connected to the telephone network 104 and to the Internet 110. The connection between the network server 116 and the telephone network 104 may be through the Internet 110 or through a private network (as illustrated by the dashed arrows). The network server 116 may also be implemented as a server within the network infrastructure of a cloud service provider network 118. Communication between the network server 116 and the mobile devices 102 may be achieved through the telephone network 104, the internet 110, private network (not illustrated), or any combination thereof.

In an aspect, the network server 116 may be configured to send data/behavior models to the mobile device 102, which may receive and use the data/behavior models to identify suspicious or performance-degrading mobile device behaviors, software applications, processes, etc. The network server 116 may also send classification and modeling information to the mobile devices 102 to replace, update, create and/or maintain mobile device data/behavior models.

Figure 2:
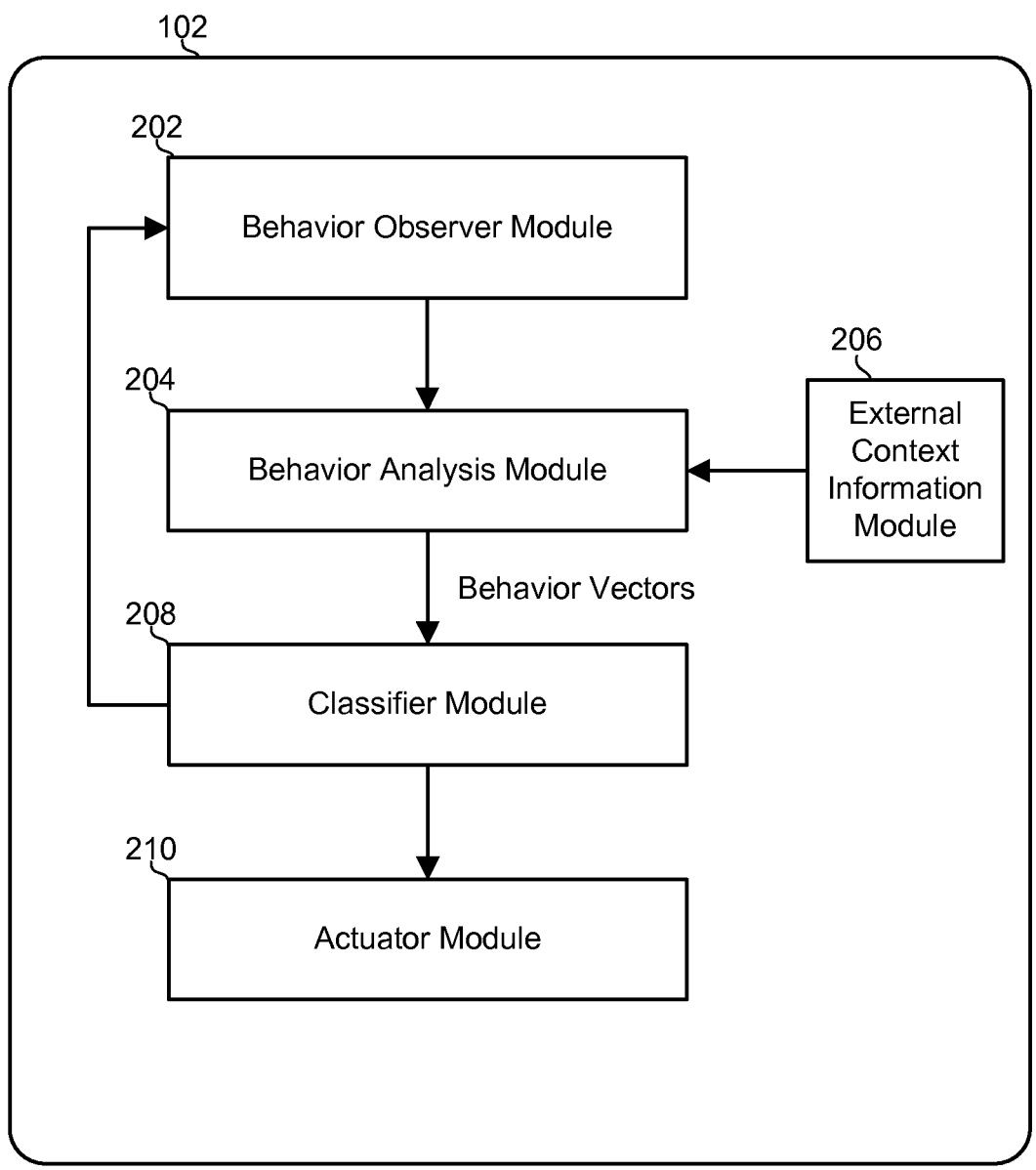
FIG. 2 is a block diagram illustrating example logical components and information flows in an aspect mobile device configured to determine whether a particular mobile device behavior, software application, or process is performance-degrading, suspicious, or benign.

FIG. 2 illustrates example logical components and information flows in an aspect mobile device 102 configured to determine whether a particular mobile device behavior, software application, or process is malicious/performance-degrading, suspicious, or benign. In the example illustrated in FIG. 2, the mobile device 102 includes a behavior observer module 202, a behavior analyzer module 204, an external context information module 206, a classifier module 208, and an actuator module 210. In an aspect, the classifier module 208 may be implemented as part of the behavior analyzer module 204. In an aspect, the behavior analyzer module 204 may be configured to generate one or more classifier modules 208, each of which may include one or more classifiers.

Each of the modules 202-210 may be implemented in software, hardware, or any combination thereof. In various aspects, the modules 202-210 may be implemented within parts of the operating system (e.g., within the kernel, in the kernel space, in the user space, etc.), within separate programs or applications, in specialized hardware buffers or processors, or any combination thereof. In an aspect, one or more of the modules 202-210 may be implemented as software instructions executing on one or more processors of the mobile device 102.

The behavior observer module 202 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer module 204.

The behavior observer module 202 may monitor/observe mobile device operations and events by collecting information pertaining to library API calls in an application framework or run-time libraries, system call APIs, file-system and networking sub-system operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor/observe one or more hardware counters that denote the state or status of the mobile computing device and/or mobile device sub-systems. A hardware counter may include a special-purpose register of the processors/cores that is configured to store a count or state of hardware-related activities or events occurring in the mobile computing device.

The behavior observer module 202 may also monitor/observe actions or operations of software applications, software downloads from an application download server (e.g., Apple® App Store server), mobile device information used by software applications, call information, text messaging information (e.g., SendSMS, BlockSMS, ReadSMS, ect.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may monitor/observe usage of and updates/changes to compass information, mobile device settings, battery life, gyroscope information, pressure sensors, magnet sensors, screen activity, etc. The behavior observer module 202 may monitor/observe notifications communicated to and from a software application (AppNotifications), application updates, etc. The behavior observer module 202 may monitor/observe conditions or events pertaining to a first software application requesting the downloading and/or install of a second software application. The behavior observer module 202 may monitor/observe conditions or events pertaining to user verification, such as the entry of a password, etc.

The behavior observer module 202 may also monitor/observe conditions or events at multiple levels of the mobile device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile device before establishing radio communication links or transmitting information, dual/multiple SIM cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user).

Other examples of sensor level observations related to usage or external environments may include, detecting near-field communications (NFC), collecting information from a credit card scanner, barcode scanner, or mobile tag reader, detecting the presence of a USB power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

To reduce the number of factors monitored to a manageable level, in an aspect, the behavior observer module 202 may perform coarse observations by monitoring/observing an initial set of behaviors or factors that are a small subset of all factors that could contribute to the mobile device's degradation. In various aspects, the behavior observer module 202 may receive the initial set of behaviors and/or factors from other mobile devices, a network server 116, or a component in a cloud service or network 118. In an aspect, the initial set of behaviors/factors may be specified in data/behavior models received from the other mobile device, network server 116 or cloud service/network 118. In an aspect, the initial set of behaviors/factors may be specified in a reduced feature model (RFMs).

The behavior analyzer module 204 and/or classifier module 208 may receive the observations from the behavior observer module 202, compare the received information (i.e., observations) with contextual information received from the external context information module 206, and identify subsystems, processes, and/or applications associated with the received observations that are contributing to (or are likely to contribute to) the device's degradation over time, or which may otherwise cause problems on the device.

In an aspect, the behavior analyzer module 204 and/or classifier module 208 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 204 may be configured to analyze information (e.g., in the form of observations) collected from various modules (e.g., the behavior observer module 202, external context information module 206, etc.), learn the normal operational behaviors of the mobile device, and generate one or more behavior vectors based the results of the comparisons. The behavior analyzer module 204 may send the generated behavior vectors to the classifier module 208 for further analysis. The behavior analyzer module 204 may also send the generated behavior vectors to one or more other mobile devices that are in the same trusted network as the mobile device.

The classifier module 208 may receive the behavior vectors and compare them to one or more behavior modules to determine whether a particular mobile device behavior, software application, or process is performance-degrading/malicious, benign, or suspicious.

When the classifier module 208 determines that a behavior, software application, or process is malicious or performance-degrading, the classifier module 208 may notify the actuator module 210, which may perform various actions or operations to correct mobile device behaviors determined to be malicious or performance-degrading and/or perform operations to heal, cure, isolate, or otherwise fix the identified problem.

When the classifier module 208 determines that a behavior, software application, or process is suspicious, the classifier module 208 may notify the behavior observer module 202, which may adjust the adjust the granularity of its observations (i.e., the level of detail at which mobile device behaviors are observed) and/or change the behaviors that are observed based on information received from the classifier module 208 (e.g., results of the real-time analysis operations), generate or collect new or additional behavior information, and send the new/additional information to the behavior analyzer module 204 and/or classifier module 208 for further analysis/classification. Such feedback communications between the behavior observer module 202 and the classifier module 208 enable the mobile device 102 to recursively increase the granularity of the observations (i.e., make finer or more detailed observations) or change the features/behaviors that are observed until a source of a suspicious or performance-degrading mobile device behavior is identified, until a processing or batter consumption threshold is reached, or until the mobile device processor determines that the source of the suspicious or performance-degrading mobile device behavior cannot be identified from further increases in observation granularity. Such feedback communication also enable the mobile device 102 to adjust or modify the data/behavior models locally in the mobile device without consuming an excessive amount of the mobile device's processing, memory, or energy resources.

In an aspect, the behavior observer module 202 and the behavior analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the behavior observer module 202 enables the mobile device 102 to efficiently identify and prevent problems from occurring on mobile devices without requiring a large amount of processor, memory, or battery resources on the device.

Figure 3:
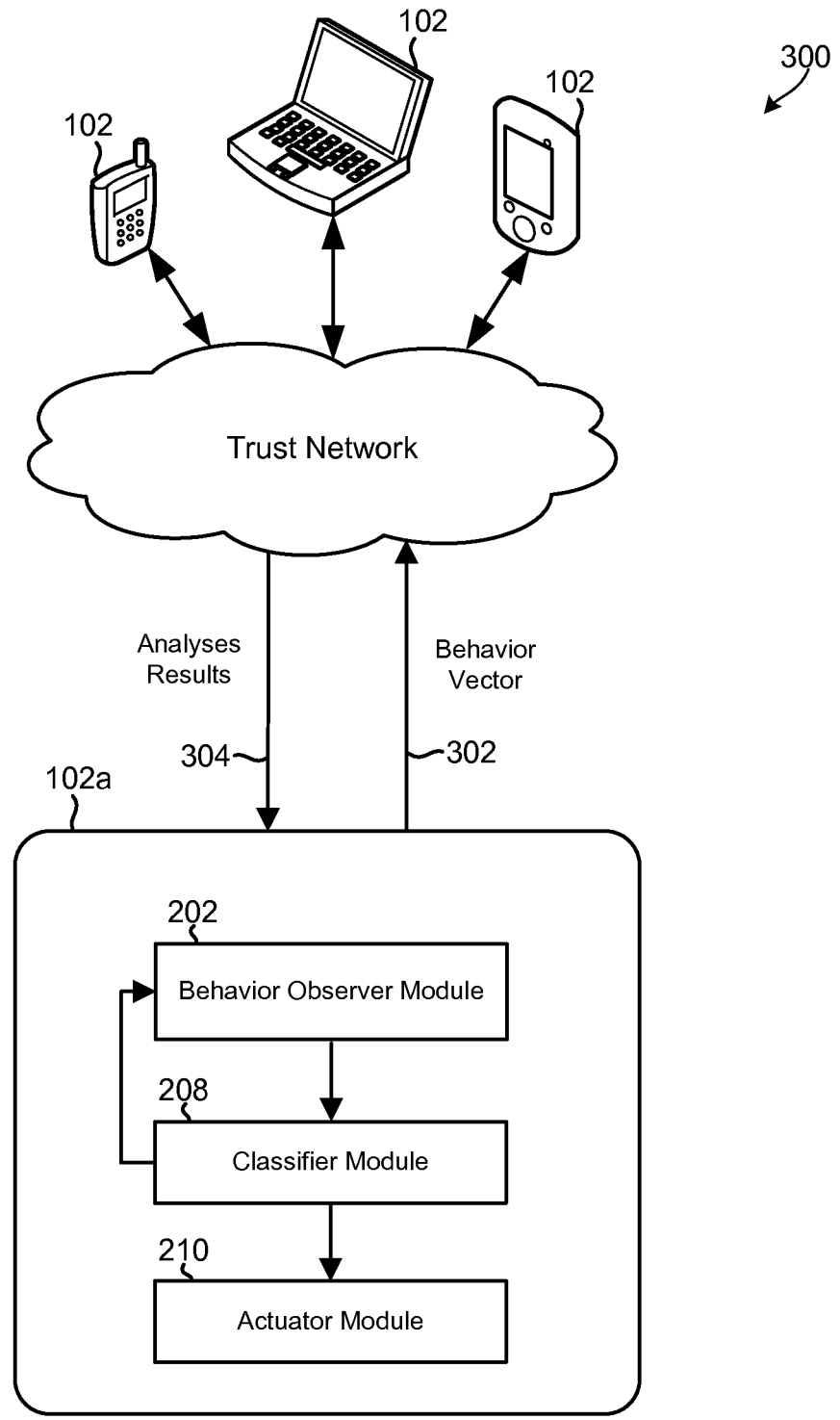
FIG. 3 is a block diagram illustrating example components and information flows in an aspect system configured to work collaborate with other mobile devices to identify actively malicious or poorly written software applications and/or suspicious or performance-degrading mobile device behaviors of a mobile device.

FIG. 3 illustrates example components and information flows in an aspect system 300 that includes a plurality of mobile devices configured to work in conjunction each other intelligently and efficiently identify actively malicious or poorly written software applications and/or suspicious or performance-degrading mobile device behaviors without consuming an excessive amount of processing, memory, or energy resources of the mobile devices. Each mobile device 102 may include a behavior observer module 202, a behavior analysis module, a classifier module 208, and an actuator module 210.

The behavior observer module 202 of a first mobile device 102a may monitor/observe mobile device behaviors, generate observations or behavior vectors, and send the observations/behavior vectors to the classifier module 208. The classifier module 208 may perform real-time analysis operations, which may include generating or evaluating behavior vectors, applying data/behavior models to behavior information collected by the behavior observer module 202, and determining whether a mobile device behavior is benign, suspicious, or malicious/performance-degrading. The classifier module 208 may determine that a mobile device behavior is suspicious when the classifier module 208 does not have sufficient information to classify or conclusively determine that the behavior is either benign or malicious.

In an aspect, the first mobile device 102 may be configured to send the behavior vector 302, along with signatures, confidence values, classifier parameters, and other similar information, to one or more of the plurality of mobile devices 102 in the trust network. In various aspects the first mobile device 102 may send the behavior vector 302 when collaborative conditions exist and/or when the classifier module 208 does not have sufficient information to classify or conclusively determine that the behavior is benign or malicious.

One or more of the plurality of mobile devices 102 may receive the behavior vector 302 and perform real-time analysis operations by applying the received behavior vector 302 to a classifier or data/behavior model in the receiving mobile device 102 to generate analysis results 304, and send the analysis results 304 back to the first mobile device 102. The first mobile device 102a may receive the analysis results 304 and collate, combine, amalgamate, or correlate the received results with the results of real-time analysis operations generated by the classifier module 208 of the first mobile device 102a. In various aspects, the received and self generated results/models may be combined using known methods of combining results of weak learners, such as statistical analysis methods, boosted decision tree analysis (see below), machine learning methods, and context modeling techniques. The first mobile device 102a may then use to the combined/collated results to determine whether the mobile device behavior is benign or malicious/performance-degrading with a higher degree of confidence.

In an aspect, the classifier module 208 in each individual mobile device 102a, 102 may be a weak machine learning classifier, and the combination of the results of the multiple classifiers may create a strong machine learning classifier.

In an aspect, each classifier module 208 of the plurality of mobile devices 102 may output a behavior signature, analysis results, and a confidence value. The behavior signature may be a concise representation of a mobile device behavior, such as a vector of numbers, state diagram, etc.

In an aspect, the mobile devices 102, 102a may be configured to perform hand shaking operations and other coordination operations to accomplish the collaboration operations and/or to share the behavior signature, analysis results, and confidence values information.

In an aspect, the classifier module 208 may also be configured to communicate the results of its real-time analysis operations to its behavior observer module 202 when the combined/collated results are not sufficient to conclusively classify (i.e., with a high enough degree of confidence) a mobile device behavior as either benign or malicious. The behavior observer module 202 may adjust the granularity of its observations (i.e., the level of detail at which mobile device behaviors are observed) and/or change the behaviors that are observed based on information received from the classifier module 208 (e.g., based on the results of the real-time analysis operations), generate or collect new or additional behavior information. In this manner, the mobile device 102a may recursively increase the granularity of the observations (i.e., make finer or more detailed observations) or change the features/behaviors that are observed until the generated behavior vector is suitable for identifying a source of a suspicious or performance-degrading mobile device behavior, or until a processing or battery consumption threshold is reached, or until the mobile device processor determines that the source of the suspicious or performance-degrading mobile device behavior cannot be identified from further increases in observation granularity.

In addition, the mobile device may repeatedly send new and updated behavior vectors 302 to the plurality of mobile devices 102 and receive new, improved or updated analysis results 303. The iterative and repeated sharing of such information allows for collaborative learning, more accurate classification of mobile device behaviors, and near continuous refinement the of data/behavior models used by the mobile devices 102, 102a. Further, the more trusted mobile devices 102 that send their analyses results 302 in this manner, the better the combination result that each mobile device can achieve.

Figure 4:
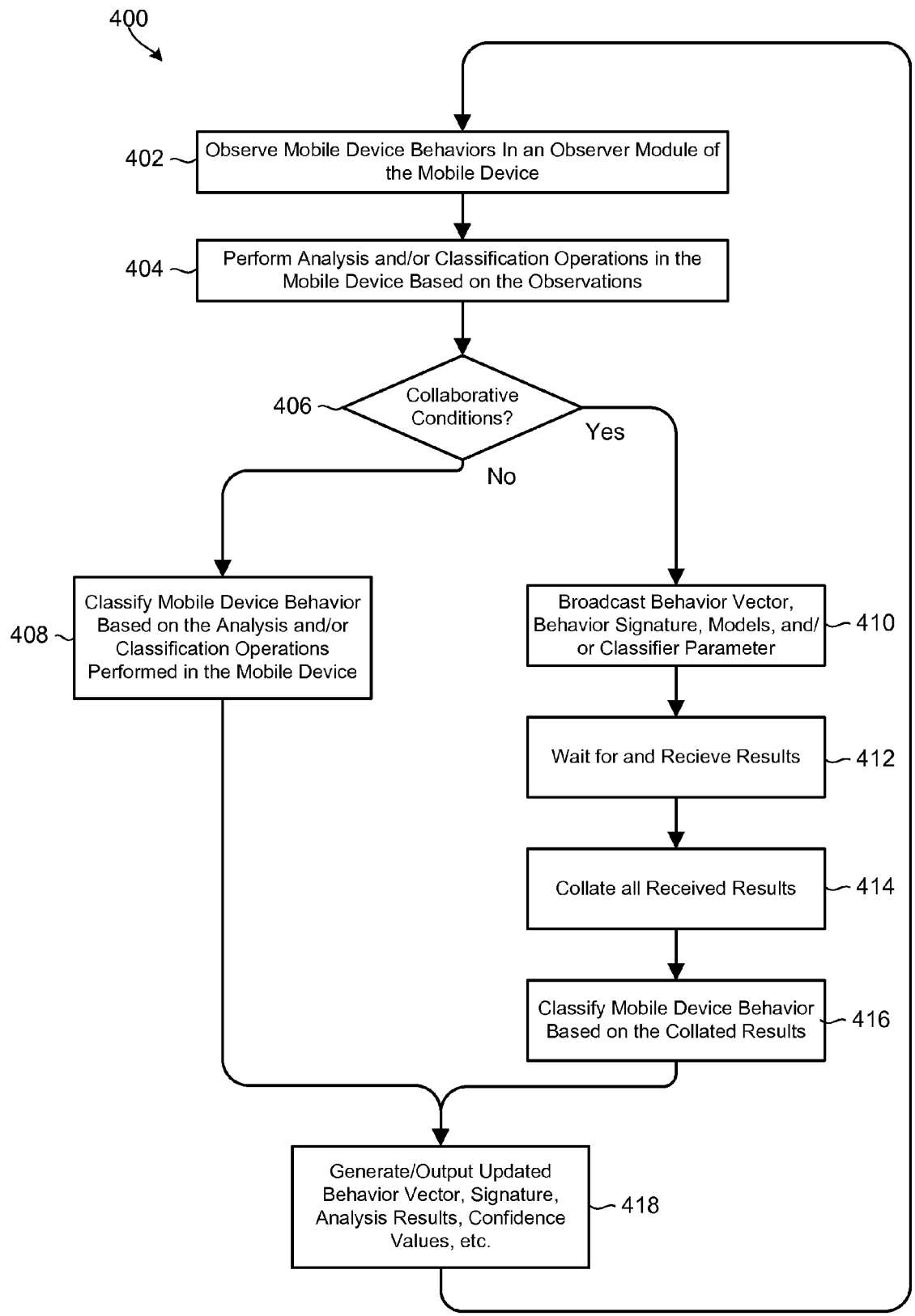
FIG. 4 is a process flow diagram illustrating an aspect mobile device method of performing collaborative behavior analysis operations.

FIG. 4 illustrates an aspect mobile device method 400 for performing collaborative learning operations. In block 402, a processor of a mobile device may observer mobile device behaviors, such via an observer module of the mobile device. In block 404, the processor may perform behavior analysis and/or classification operations based on the information collected from observing the mobile device behaviors. In determination block 406, the mobile device processor may determine whether collaborative conditions exist, such as by determining if the mobile device includes communication links to other mobile devices in a trusted network or is a member of a trust group.

If the mobile device processor determines that collaborative conditions do not exist (i.e., determination block 406="No"), in block 408, the mobile device processor may classify the mobile device behaviors based on the results of the analysis and/or classification operations performed in the mobile device. When the mobile device processor determines that collaborative conditions do exist (i.e., determination block 406="Yes"), in block 410, the mobile device processor may broadcast its behavior vector or signature, data/behavior models, and/or classifier parameter for reception by other mobile devices in the trust network.

In block 412, the mobile device processor may wait for and receive the analysis/classification results from the other mobile devices in the trusted network. In block 414, the mobile device processor may collate or combine the received results. In block 416, the mobile device processor may classify a mobile device behavior based on the combined/collated results. In block 418, the mobile device processor may generate or output updated behavior vectors, signatures, analysis results, confidence values, and other similar information based on the classifications.

The operations of blocks 402-418 may be repeated until a source of a suspicious or performance-degrading mobile device behavior is identified, a processing or battery consumption threshold is reached, or until the mobile device processor determines that the source of the suspicious or performance-degrading mobile device behavior cannot be identified.

Figure 5:
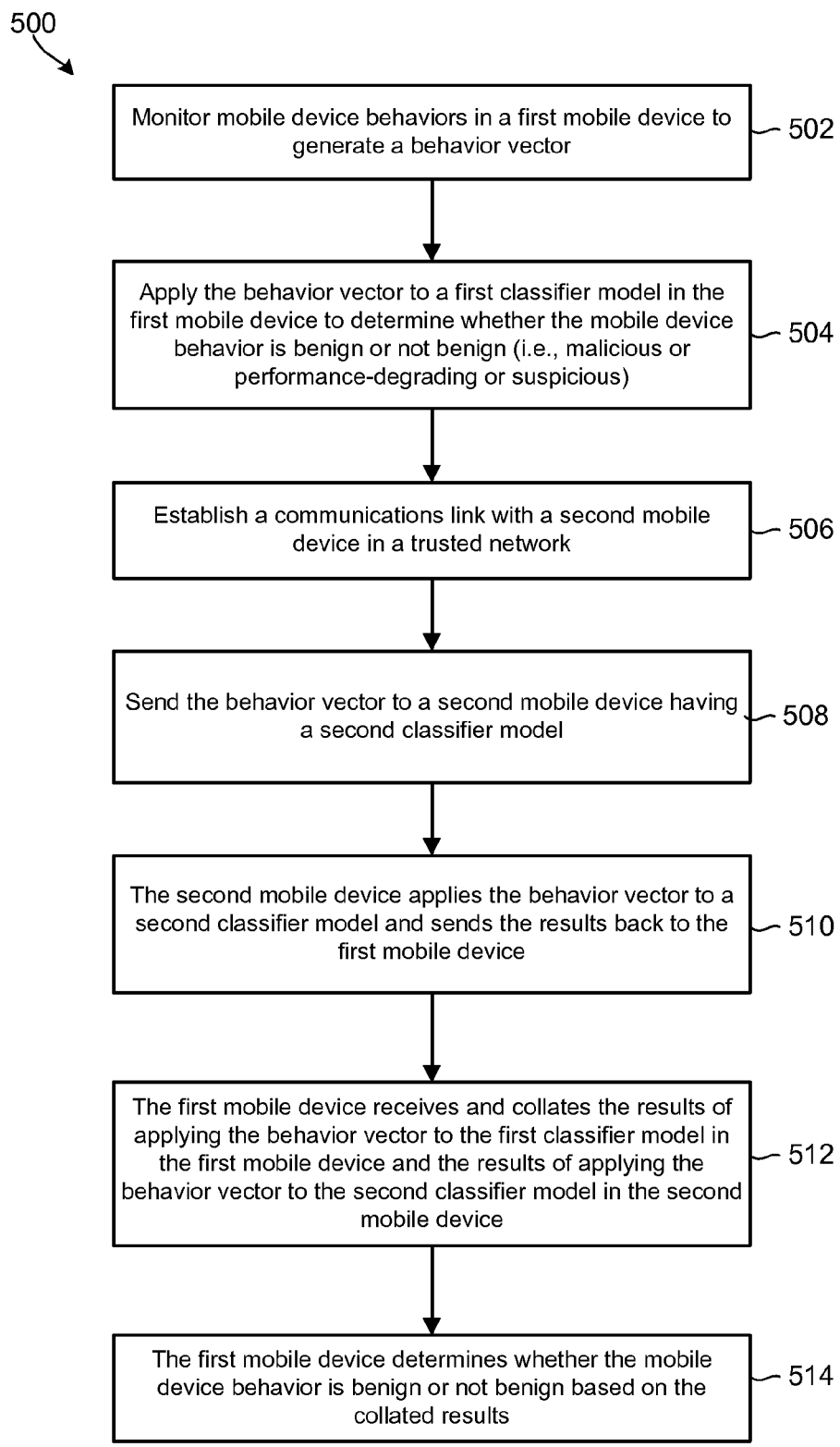
FIG. 5 is a process flow diagram illustrating an aspect system method of performing collaborative behavior analysis operations.

FIG. 5 illustrates an aspect system method 500 for performing collaborative learning operations. In block 502, a mobile device processor may monitor mobile device behaviors and generate a behavior vector. In block 504, the mobile device processor may apply the behavior vector to a first classifier model in the first mobile device to determine whether the mobile device behavior is benign or not benign (i.e., malicious, performance degrading, or suspicious). In block 506, the mobile device processor may establish a communication link to a second mobile device in the trusted network. In an embodiment, as part of 506, the mobile device processor may join a trust network that includes a plurality of trusted mobile devices by performing group formation operations that include establishing direct communication links to each of the plurality of trusted mobile devices via peer-to-peer and/or WiFi-Direct technologies.

In block 508, the mobile device processor may send the behavior vector to a second mobile device having a second classifier model. In an embodiment, the second mobile device may be included in the plurality of trusted mobile devices, and sending the behavior vector to the second mobile device may include sending the behavior vector to one of the plurality of trusted mobile devices. In block 510, a processor of the second mobile device may apply the received behavior vector to the second classifier model and send the results to the first mobile device processor. That is, in blocks 508 and 510, the first mobile device may send the behavior vector to a second mobile device, and the second mobile device may apply the behavior vector to a second classifier model, obtain a second determination of whether the mobile device behavior is benign or not benign, and send the second determination to the first mobile device. As part of this operation, the second classifier model may also generate or calculate a confidence value for the second determination which may also be sent to the first mobile device.

In block 512, the first mobile device processor may receive and collate/combine the results of applying the behavior vector to the first classifier model in the first mobile device and the results of applying the behavior vector to the second classifier model in the second mobile device. That is, in block 512, the first mobile device may collate the first determination (generated in the first mobile device) and the second determination (generated in the second mobile device) to generate collated results. In an embodiment, collating the first determination and the second determination to generate collated results may include generating a weighted linear combination of the first determination and the second determination. In embodiment, collating the first determination and the second determination to generate collated results may include multiplying the first determination by a first confidence value obtained from the first classifier model to generate a first result, multiplying the second determination by a second confidence value received from the second mobile device to generate a second result, and summing the first result with the second result. In block 514, the first mobile device processor may determine whether the mobile device behavior is benign or not benign based on the collated results.

Figure 6:
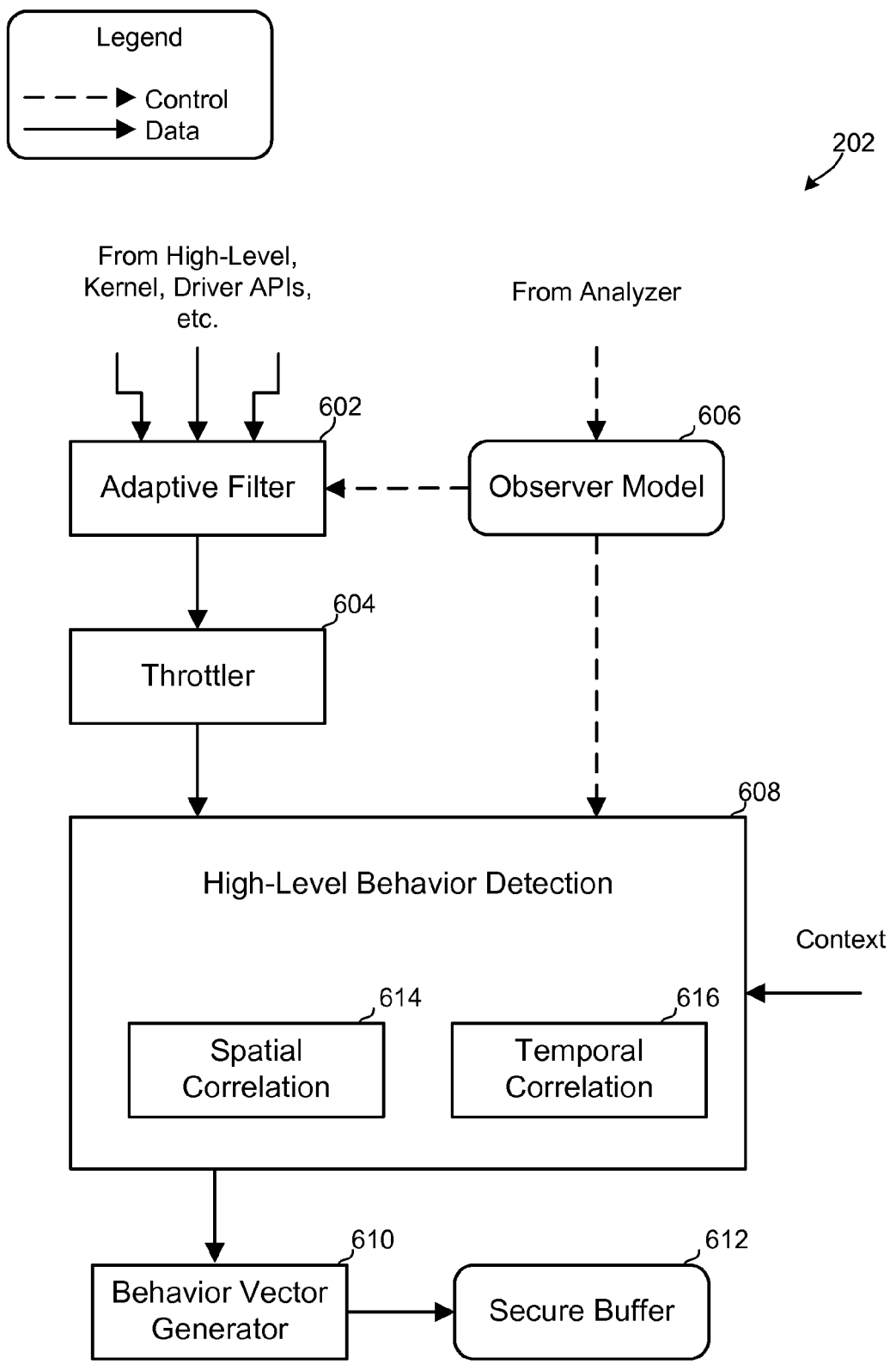
FIG. 6 is a block diagram illustrating example logical components and information flows in an observer module configured to perform dynamic and adaptive observations in accordance with an aspect.

FIG. 6 illustrates example logical components and information flows in a behavior observer module 202 of a computing system configured to perform dynamic and adaptive observations in accordance with an aspect. The behavior observer module 202 may include an adaptive filter module 602, a throttle module 604, an observer mode module 606, a high-level behavior detection module 608, a behavior vector generator 610, and a secure buffer 612. The high-level behavior detection module 608 may include a spatial correlation module 614 and a temporal correlation module 616.

The observer mode module 606 may receive control information from various sources, which may include an analyzer unit (e.g., the behavior analyzer module 204 described above with reference to FIG. 2) and/or an application API. The observer mode module 606 may send control information pertaining to various observer modes to the adaptive filter module 602 and the high-level behavior detection module 608.

The adaptive filter module 602 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 604, which may be responsible for controlling the amount of information flowing from the filter to ensure that the high-level behavior detection module 608 does not become flooded or overloaded with requests or information.

The high-level behavior detection module 608 may receive data/information from the throttle module 604, control information from the observer mode module 606, and context information from other components of the mobile device. The high-level behavior detection module 608 may use the received information to perform spatial and temporal correlations to detect or identify high level behaviors that may cause the device to perform at sub-optimal levels. The results of the spatial and temporal correlations may be sent to the behavior vector generator 610, which may receive the correlation information and generate a behavior vector that describes the behaviors of particular process, application, or sub-system. In an aspect, the behavior vector generator 610 may generate the behavior vector such that each high-level behavior of a particular process, application, or sub-system is an element of the behavior vector. In an aspect, the generated behavior vector may be stored in a secure buffer 612. Examples of high-level behavior detection may include detection of the existence of a particular event, the amount or frequency of another event, the relationship between multiple events, the order in which events occur, time differences between the occurrence of certain events, etc.

In the various aspects, the behavior observer module 202 may perform adaptive observations and control the observation granularity. That is, the behavior observer module 202 may dynamically identify the relevant behaviors that are to be observed, and dynamically determine the level of detail at which the identified behaviors are to be observed. In this manner, the behavior observer module 202 enables the system to monitor the behaviors of the mobile device at various levels (e.g., multiple coarse and fine levels). The behavior observer module 202 may enable the system to adapt to what is being observed. The behavior observer module 202 may enable the system to dynamically change the factors/behaviors being observed based on a focused subset of information, which may be obtained from a wide verity of sources.

As discussed above, the behavior observer module 202 may perform adaptive observation techniques and control the observation granularity based on information received from a variety of sources. For example, the high-level behavior detection module 608 may receive information from the throttle module 604, the observer mode module 606, and context information received from other components (e.g., sensors) of the mobile device. As an example, a high-level behavior detection module 608 performing temporal correlations might detect that a camera has been used and that the mobile device is attempting to upload the picture to a server. The high-level behavior detection module 608 may also perform spatial correlations to determine whether an application on the mobile device took the picture while the device was holstered and attached to the user's belt. The high-level behavior detection module 608 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 608 may recognize this as a potentially threatening behavior and initiate an appropriate response (e.g., shutting off the camera, sounding an alarm, etc.).

In an aspect, the behavior observer module 202 may be implemented in multiple parts.

Figure 7:
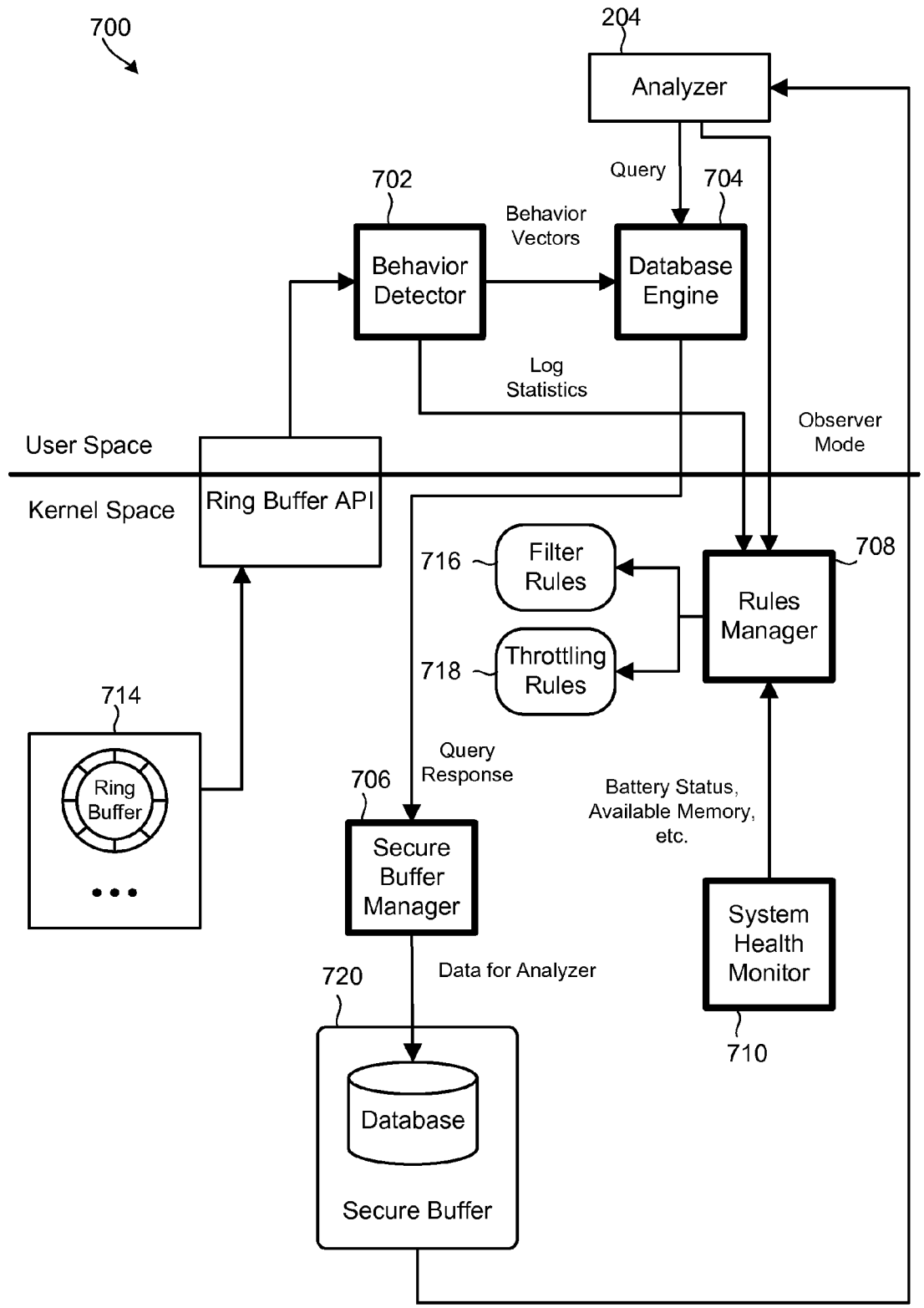
FIG. 7 is a block diagram illustrating logical components and information flows in a computing system implementing observer daemons in accordance with another aspect.

FIG. 7 illustrates logical components and information flows in a computing system 700 implementing an aspect observer daemon. In the example illustrated in FIG. 7, the computing system 700 includes a behavior detector 702 module, a database engine 704 module, and a behavior analyzer module 204 in the user space, and a ring buffer 714, a filter rules 716 module, a throttling rules 718 module, and a secure buffer 720 in the kernel space. The computing system 700 may further include an observer daemon that includes the behavior detector 702 and the database engine 704 in the user space, and the secure buffer manager 706, the rules manager 708, and the system health monitor 710 in the kernel space.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 8:
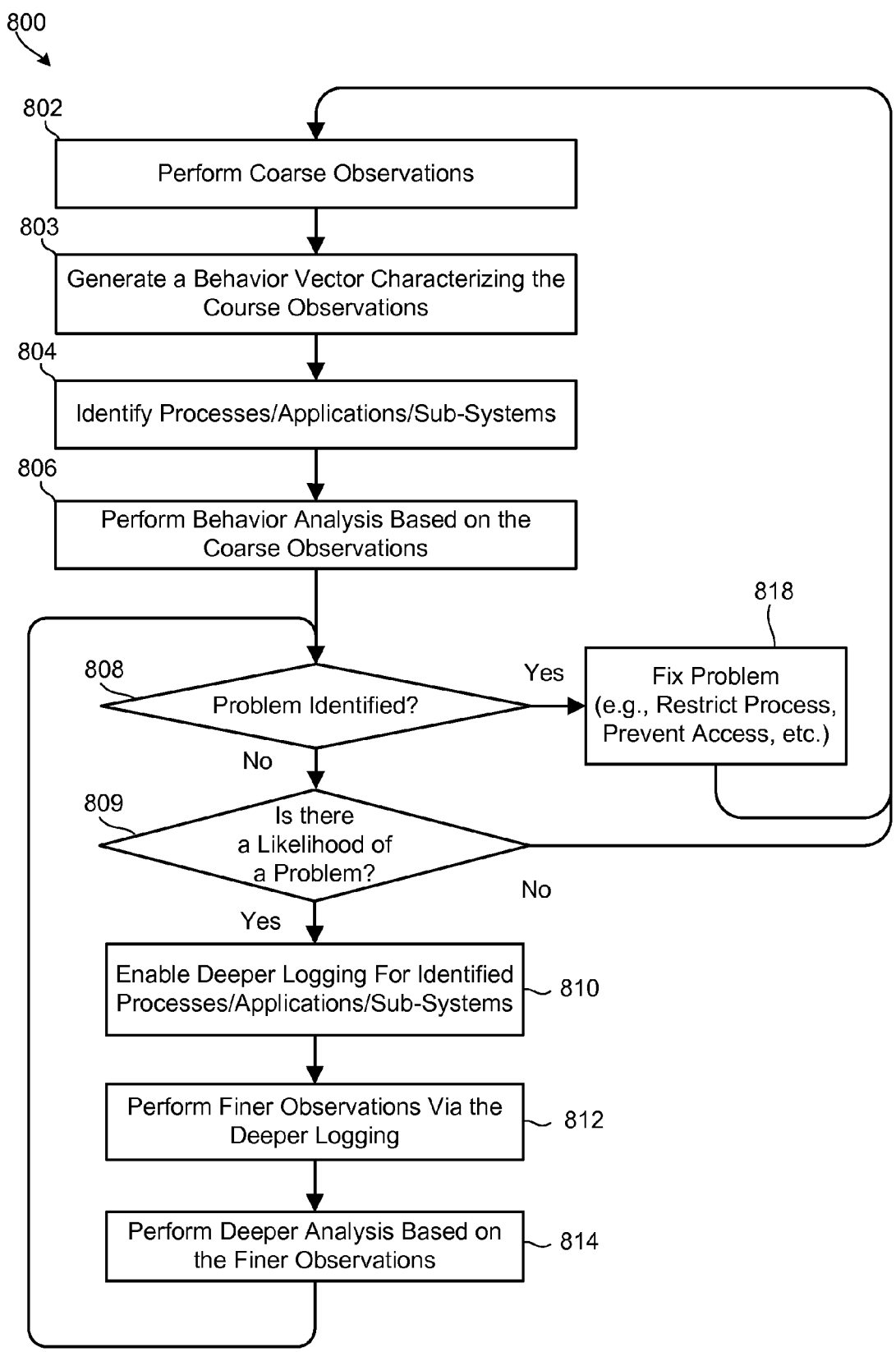
FIG. 8 is a process flow diagram illustrating an aspect method for performing adaptive observations on mobile devices.

FIG. 8 illustrates an example method 800 for performing dynamic and adaptive observations in accordance with an aspect. In block 802, the mobile device processor may perform coarse observations by monitoring/observing a subset of large number factors/behaviors that could contribute to the mobile device's degradation. In block 803, the mobile device processor may generate a behavior vector characterizing the coarse observations and/or the mobile device behavior based on the coarse observations. In block 804, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 806, the mobile device processor may perform behavioral analysis operations based on the coarse observations. In an aspect, as part of blocks 803 and 804, the mobile device processor may perform one or more of the operations discussed above with reference to FIGS. 2-9.

In determination block 808, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 808="Yes"), in block 818, the processor may initiate a process to correct the behavior and return to block 802 to perform additional coarse observations.

When the mobile device processor determines that the suspicious behaviors or potential problems can not be identified and/or corrected based on the results of the behavioral analysis (i.e., determination block 808="No"), in determination block 809 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 809="No"), the processor may return to block 802 to perform additional coarse observations.

When the mobile device processor determines that there is a likelihood that suspicious behaviors or potential problems exist and/or are detectable (i.e., determination block 809="Yes"), in block 810, the mobile device processor may perform deeper logging/observations or final logging on the identified subsystems, processes or applications. In block 812, the mobile device processor may perform deeper and more detailed observations on the identified subsystems, processes or applications. In block 814, the mobile device processor may perform further and/or deeper behavioral analysis based on the deeper and more detailed observations. In determination block 808, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 808="No"), the processor may repeat the operations in blocks 810-814 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 808="Yes"), in block 818, the mobile device processor may perform operations to correct the problem/behavior, and the processor may return to block 802 to perform additional operations.

In an aspect, as part of blocks 802-818 of method 800, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 9:
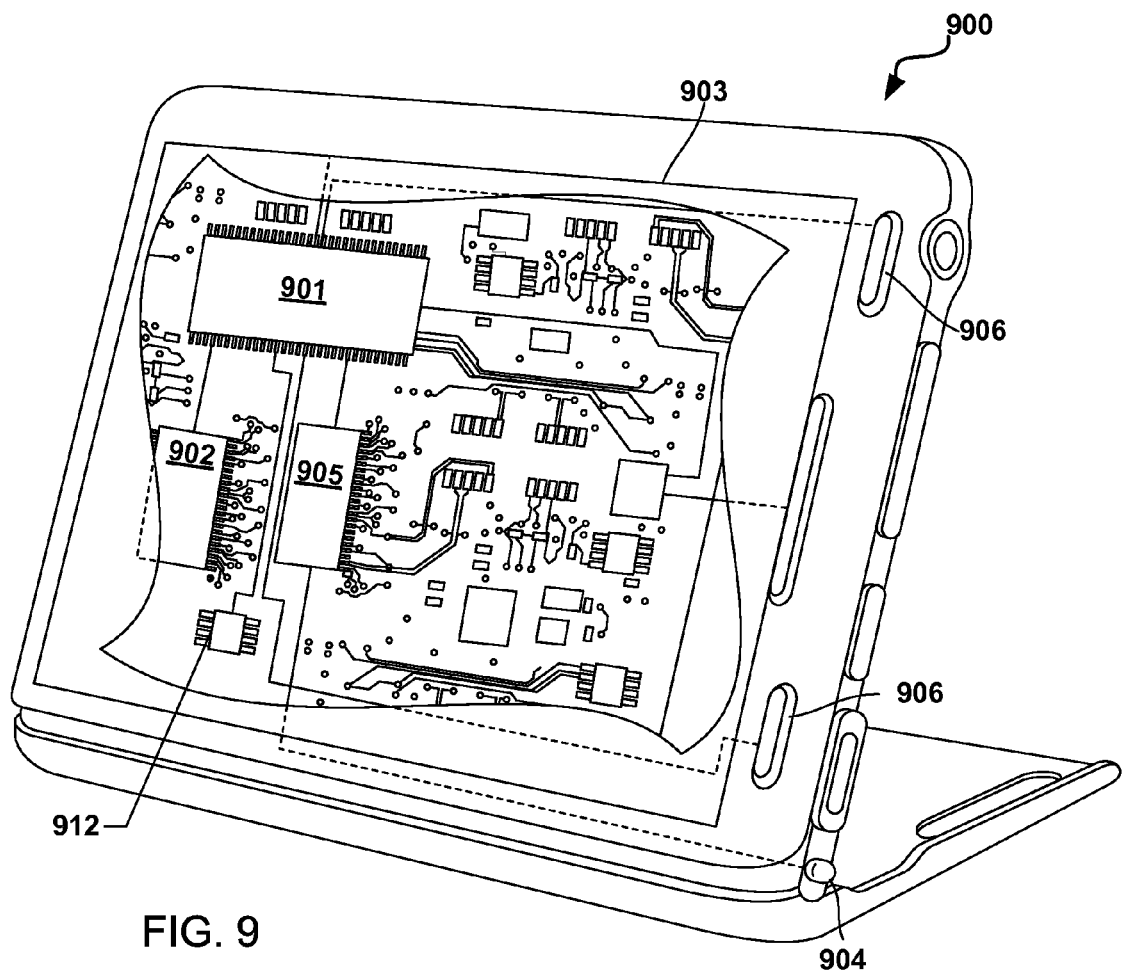
FIG. 9 is a component block diagram of a mobile device suitable for use in an aspect.

The various aspects may be implemented on a variety of mobile computing devices, an example of which is illustrated in FIG. 9 in the form of a smartphone. A smartphone 900 may include a processor 901 coupled to internal memory 902, a display 903, and to a speaker. Additionally, the smartphone 900 may include an antenna 904 for sending and receiving electromagnetic radiation that may be connected to a wireless data link and/or cellular telephone transceiver 905 coupled to the processor 901. Smartphone 900 typically also include menu selection buttons or rocker switches 906 for receiving user inputs.

A typical smartphone 900 also includes a sound encoding/decoding (CODEC) circuit 912, which digitizes sound received from a microphone into data packets suitable for wireless transmission and decodes received sound data packets to generate analog signals that are provided to the speaker to generate sound. Also, one or more of the processor 901, wireless transceiver 905 and CODEC 912 may include a digital signal processor (DSP) circuit (not shown separately).

Figure 10:
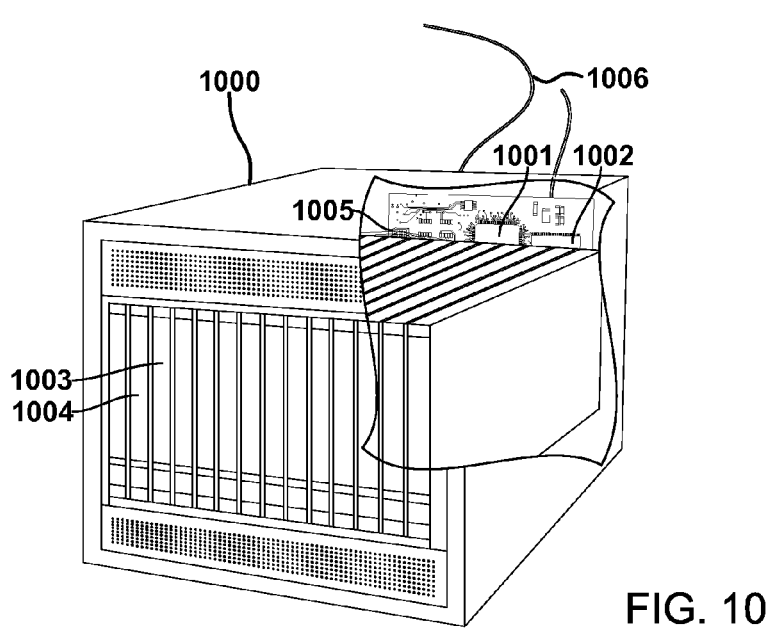
FIG. 10 is a component block diagram of a server device suitable for use in an aspect.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1005 coupled to the processor 1001 for establishing data connections with a network 1006, such as a local area network coupled to other broadcast system computers and servers.

The processors 901, 1001 may be any programmable microprocessor, microcomputer or multiple processor chip or chips that can be configured by software instructions (applications) to perform a variety of functions, including the functions of the various aspects described below. In some mobile devices, multiple processors 901 may be provided, such as one processor dedicated to wireless communication functions and one processor dedicated to running other applications. Typically, software applications may be stored in the internal memory 902, 1002, 1003 before they are accessed and loaded into the processor 901, 1001. The processor 901, 1001 may include internal memory sufficient to store the application software instructions.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of classifying mobile device behaviors of a mobile device, comprising:
   monitoring mobile device behaviors in a first mobile device to generate a behavior vector data structure that characterizes a behavior of a software application operating on the first mobile device;
   applying the behavior vector data structure to a first classifier model in the first mobile device to obtain a first determination of a classification of the behavior of the software application operating on the first mobile device;
   sending the behavior vector data structure to a second mobile device, the second mobile device applying the behavior vector data structure received from the first mobile device to a second classifier model to obtain a second determination in the second mobile device of the classification of the behavior of the software application operating on the first mobile device and sending the second determination to the first mobile device;
   collating the first determination and the second determination in the first mobile device to generate collated results; and classifying the behavior of the software application operating on the first mobile device based on the collated results.

2. The method of claim 1, wherein the first mobile device and the second mobile device are in the same local network.

3. The method of claim 1, wherein sending the behavior vector data structure to the second mobile device comprises broadcasting the behavior vector data structure to all mobile devices on the same local network.

4. The method of claim 1, wherein collating the first determination and the second determination in the first mobile device to generate the collated results comprises generating a weighted linear combination of the first determination and the second determination.

5. The method of claim 1, wherein collating the first determination and the second determination in the first mobile device to generate the collated results comprises:
    multiplying the first determination by a first confidence value to generate a first result;
    multiplying the second determination by a second confidence value to generate a second result; and
    summing the first result with the second result,
    wherein the first confidence value is determined by the first classifier model, and
    wherein the second confidence value is determined by the second classifier model in the second mobile device and sent to the first mobile device along with the second determination.

6. The method of claim 1, further comprising:
    joining a trust network that includes a plurality of trusted mobile devices by performing group formation operations that include establishing direct communication links to each of the plurality of trusted mobile devices via WiFi-Direct technologies, wherein sending the behavior vector data structure to the second mobile device comprises sending the behavior vector data structure to one of the plurality of trusted mobile devices.

7. The method of claim 1, wherein:
    applying the behavior vector data structure to the first classifier model in the first mobile device to obtain the first determination of the classification of the behavior of the software application operating on the first mobile device comprises applying the behavior vector data structure to the first classifier model in the first mobile device to obtain a determination of whether the behavior of the software application operating on the first mobile device is not benign; and
    classifying the behavior of the software application operating on the first mobile device based on the collated results comprises determining whether the behavior of the software application operating on the first mobile device is not benign based on the collated results.

8. A mobile device comprising:
    means for monitoring mobile device behaviors to generate a behavior vector data structure that characterizes a behavior of a software application operating on the mobile device;
    means for applying the behavior vector data structure to a first classifier model to obtain a first determination of a classification of the behavior of the software application operating on the mobile device;
    means for sending the behavior vector data structure to a second mobile device and causing the second mobile device to apply the behavior vector data structure to a second classifier model to obtain a second determination of the classification of the behavior of the software application operating on the mobile device;
    means for receiving the second determination from the second mobile device in response to sending the behavior vector data structure to the second mobile device;
    means for collating the first determination and the second determination to generate collated results; and
    means for classifying the behavior of the software application operating on the mobile device based on the collated results.

9. The mobile device of claim 8, wherein means for sending the behavior vector data structure to the second mobile device comprises means for sending the behavior vector data structure to a mobile computing device in a local network.

10. The mobile device of claim 8, wherein means for sending the behavior vector data structure to the second mobile device comprises means for broadcasting the behavior vector data structure to all mobile devices in a local network.

11. The mobile device of claim 8, wherein means for collating the first determination and the second determination to generate the collated results comprises means for generating a weighted linear combination of the first determination and the second determination.

12. The mobile device of claim 8, wherein means for collating the first determination and the second determination to generate the collated results comprises:
    means for multiplying the first determination by a first confidence value to generate a first result;
    means for multiplying the second determination by a second confidence value to generate a second result; and
    means for summing the first result with the second result,
    wherein the first confidence value is determined by the first classifier model, and
    wherein the second confidence value is determined by the second classifier model in the second mobile device and sent to the mobile device along with the second determination.

13. The mobile device of claim 8, further comprising:
    means for joining a trust network that includes a plurality of trusted mobile devices by performing group formation operations that include establishing direct communication links to each of the plurality of trusted mobile devices via WiFi-Direct technologies, and wherein means for sending the behavior vector data structure to the second mobile device comprises means for sending the behavior vector data structure to one of the plurality of trusted mobile devices.

14. The mobile device of claim 8, wherein:
    means for applying the behavior vector data structure to the first classifier model to obtain the first determination of the classification of the behavior of the software application operating on the mobile device comprises means for applying the behavior vector data structure to the first classifier model to obtain a determination of whether the behavior of the software application operating on the mobile device is not benign; and
    means for classifying the behavior of the software application operating on the mobile device based on the collated results comprises means for determining whether the behavior of the software application operating on the mobile device is not benign based on the collated results.

15. A mobile device, comprising:
    a processor configured with processor-executable instructions to perform operations comprising:
        monitoring mobile device behaviors to generate a behavior vector data structure that characterizes a behavior of a software application operating on the mobile device;

applying the behavior vector data structure to a first classifier model to obtain a first determination of a classification of the behavior of the software application operating on the mobile device;

sending the behavior vector data structure to a second mobile device so as to cause the second mobile device to apply the behavior vector data structure to a second classifier model to obtain a second determination of the classification of the behavior of the software application operating on the mobile device;

receiving the second determination from the second mobile device in response to sending the behavior vector data structure to the second mobile device;

collating the first determination and the second determination to generate collated results; and classifying the behavior of the software application operating on the mobile device based on the collated results.

16. The mobile device of claim 15, wherein the processor is configured with processor-executable instructions to perform operations such that sending the behavior vector data structure to the second mobile device comprises sending the behavior vector data structure to a mobile computing device in a local network.

17. The mobile device of claim 15, wherein the processor is configured with processor-executable instructions to perform operations such that sending the behavior vector data structure to the second mobile device comprises broadcasting the behavior vector data structure to all mobile devices in a local network.

18. The mobile device of claim 15, wherein the processor is configured with processor-executable instructions to perform operations such that collating the first determination and the second determination to generate the collated results comprises generating a weighted linear combination of the first determination and the second determination.

19. The mobile device of claim 15, wherein the processor is configured with processor-executable instructions to perform operations such that collating the first determination and the second determination to generate the collated results comprises:

multiplying the first determination by a first confidence value to generate a first result;

multiplying the second determination by a second confidence value to generate a second result; and summing the first result with the second result, wherein the first confidence value is determined by the first classifier model, and wherein the second confidence value is determined by the second classifier model in the second mobile device and sent to the mobile device along with the second determination.

20. The mobile device of claim 15, wherein the processor is configured with processor-executable instructions to perform operations further comprising:

joining a trust network that includes a plurality of trusted mobile devices by performing group formation operations that include establishing direct communication links to each of the plurality of trusted mobile devices via WiFi-Direct technologies, wherein sending the behavior vector data structure to the second mobile device comprises sending the behavior vector data structure to one of the plurality of trusted mobile devices.

21. The mobile device of claim 15, wherein the processor is configured with processor- executable instructions to perform operations such that:

applying the behavior vector data structure to the first classifier model to obtain the first determination of the classification of the behavior of the software application operating on the mobile device comprises applying the behavior vector data structure to the first classifier model to obtain a determination of whether the behavior of the software application operating on the mobile device is not benign; and classifying the behavior of the software application operating on the mobile device based on the collated results comprises determining whether the behavior of the software application operating on the mobile device is not benign based on the collated results.

22. A non-transitory computer readable storage medium having stored thereon processor-executable software instructions configured to cause a mobile device processor in a mobile device to perform operations comprising:

monitoring mobile device behaviors to generate a behavior vector data structure that characterizes a behavior of a software application operating on the mobile device;

applying the behavior vector data structure to a first classifier model to obtain a first determination of a classification of the behavior of the software application operating on the mobile device;

sending the behavior vector data structure to a second mobile device so as to cause the second mobile device to apply the behavior vector data structure to a second classifier model to obtain a second determination of the classification of the behavior of the software application operating on the mobile device;

receiving the second determination from the second mobile device in response to sending the behavior vector data structure to the second mobile device;

collating the first determination and the second determination to generate collated results; and classifying the behavior of the software application operating on the mobile device based on the collated results.

23. The non-transitory computer readable storage medium of claim 22, wherein the stored processor-executable software instructions are configured to cause the mobile device processor to perform operations such that sending the behavior vector data structure to the second mobile device comprises sending the behavior vector data structure to a mobile computing device in a local network.

24. The non-transitory computer readable storage medium of claim 22, wherein the stored processor-executable software instructions are configured to cause the mobile device processor to perform operations such that sending the behavior vector data structure to the second mobile device comprises broadcasting the behavior vector data structure to all mobile devices in a local network.

25. The non-transitory computer readable storage medium of claim 22, wherein the stored processor-executable software instructions are configured to cause the mobile device processor to perform operations such that collating the first determination and the second determination to generate the collated results comprises generating a weighted linear combination of the first determination and the second determination.

26. The non-transitory computer readable storage medium of claim 22, wherein the stored processor-executable software instructions are configured to cause the mobile device processor to perform operations such that collating the first determination and the second determination to generate the collated results comprises:

multiplying the first determination by a first confidence value to generate a first result;

multiplying the second determination by a second confidence value to generate a second result; and summing the first result with the second result,
wherein the first confidence value is determined by the first classifier model, and
wherein the second confidence value is determined by the second classifier model in the second mobile device and sent to the mobile device processor along with the second determination.

27. The non-transitory computer readable storage medium of claim 19, wherein the stored processor-executable software instructions are configured to cause the mobile device processor to perform operations further comprising:
joining a trust network that includes a plurality of trusted mobile devices by performing group formation operations that include establishing direct communication links to each of the plurality of trusted mobile devices via WiFi-Direct technologies, wherein sending the behavior vector data structure to the second mobile device comprises sending the behavior vector data structure to one of the plurality of trusted mobile devices.

28. The non-transitory computer readable storage medium of claim 22, wherein the stored processor-executable software instructions are configured to cause the mobile device processor to perform operations such that:
applying the behavior vector data structure to the first classifier model to obtain the first determination of the classification of the behavior of the software application operating on the mobile device comprises applying the behavior vector data structure to the first classifier model to obtain a determination of whether the behavior of the software application operating on the mobile device is not benign; and
classifying the behavior of the software application operating on the mobile device based on the collated results comprises determining whether the behavior of the software application operating on the mobile device is not benign based on the collated results.

* * * * *